United States Patent
McAndrews

(10) Patent No.: US 8,960,389 B2
(45) Date of Patent: Feb. 24, 2015

(54) BICYCLE SHOCK ABSORBER WITH SLIDABLE INERTIA MASS

(75) Inventor: Michael McAndrews, Capitola, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 820 days.

(21) Appl. No.: 12/563,055

(22) Filed: Sep. 18, 2009

(65) Prior Publication Data

US 2011/0067965 A1    Mar. 24, 2011

(51) Int. Cl.
F16F 9/00      (2006.01)
F16F 9/504     (2006.01)
B62K 25/08     (2006.01)
F16F 9/512     (2006.01)

(52) U.S. Cl.
CPC ............ *F16F 9/504* (2013.01); *B62K 25/08* (2013.01); *F16F 9/5126* (2013.01)
USPC .................. 188/322.22; 188/322.17

(58) Field of Classification Search
USPC ............ 188/275, 322.13, 322.22, 322.17
See application file for complete search history.

(56) References Cited

U.S. PATENT DOCUMENTS

| | | |
|---|---|---|
| 1,492,328 A | 4/1924 | Lang |
| 2,311,993 A | 2/1943 | Olsen |
| 3,062,330 A | 11/1962 | Lyon, Jr. |
| 3,127,958 A | 4/1964 | Szostak |
| 3,575,087 A | 4/1971 | Sherwood |
| 3,696,894 A | 10/1972 | Brady et al. |
| 3,892,298 A | 7/1975 | Blatt |
| 3,958,673 A | 5/1976 | Allinquant et al. |
| 3,998,302 A | 12/1976 | Schupner |
| 4,082,169 A | 4/1978 | Bowles |
| 4,126,302 A | 11/1978 | Curnutt |
| 4,127,038 A | 11/1978 | Browning |

(Continued)

FOREIGN PATENT DOCUMENTS

| | | |
|---|---|---|
| DE | 41 23 643 A1 | 6/1992 |
| EP | 1 352 822 | 10/2003 |

(Continued)

OTHER PUBLICATIONS http://engineershandbook.com/Tables/frictioncoefficients.htm, Copyright 2004-2006.*

(Continued)

*Primary Examiner* — Melanie Torres Williams
(74) *Attorney, Agent, or Firm* — Knobbe, Martens, Olson & Bear, LLP

(57) ABSTRACT

A damper for a bicycle having a primary unit and a remote unit that, in some arrangements, is substantially entirely outside of the primary unit. The remote unit comprises a remote fluid chamber and, in some arrangements, an inertia valve within the remote unit. The inertia valve is preferably responsive to terrain-induced forces and preferably not responsive to rider-induced forces when the shock absorber is assembled to the bicycle. The inertia valve, which is configured to slidably move within the remote reservoir unit relative to a reservoir shaft, comprises a main portion and at least one protective coating or layer configured to contact the reservoir shaft. The protective coating or layer helps shield said main portion from contact with reservoir shaft, advantageously providing wear resistance, anti-friction properties, durability and other benefits to the damping system.

15 Claims, 20 Drawing Sheets

(56) References Cited

U.S. PATENT DOCUMENTS

| | | | |
|---|---|---|---|
| 4,153,237 A | 5/1979 | Supalla | |
| 4,189,034 A | 2/1980 | Kato | |
| 4,210,344 A | 7/1980 | Curnutt | |
| 4,214,737 A | 7/1980 | Blatt | |
| 4,492,290 A | 1/1985 | Zavodny | |
| 4,572,317 A | 2/1986 | Isono et al. | |
| 4,580,997 A | 4/1986 | Browning et al. | |
| 4,592,738 A | 6/1986 | Nagano | |
| 4,679,811 A | 7/1987 | Shuler | |
| 4,790,554 A | 12/1988 | Siegwart, Jr. | |
| 4,807,860 A | 2/1989 | Simons | |
| 4,899,853 A | 2/1990 | Hummel | |
| 4,917,222 A | 4/1990 | Bacardit | |
| 4,921,225 A * | 5/1990 | Ludwig | 267/64.13 |
| 4,958,706 A | 9/1990 | Richardson | |
| 5,000,470 A | 3/1991 | Kamler et al. | |
| 5,080,392 A | 1/1992 | Bazergui | |
| 5,285,875 A | 2/1994 | Munoz | |
| 5,332,068 A | 7/1994 | Richardson et al. | |
| 5,337,864 A | 8/1994 | Sjöström | |
| 5,368,141 A | 11/1994 | Clarke | |
| 5,458,218 A | 10/1995 | Runkel | |
| 5,462,140 A | 10/1995 | Cazort et al. | |
| 5,509,679 A | 4/1996 | Leitner | |
| 5,598,903 A | 2/1997 | Richardson | |
| 5,634,653 A | 6/1997 | Browning | |
| 5,678,837 A | 10/1997 | Leitner | |
| 5,791,674 A | 8/1998 | D'Aluisio et al. | |
| 5,810,128 A | 9/1998 | Eriksson et al. | |
| 5,823,305 A | 10/1998 | Richardson et al. | |
| 5,833,036 A | 11/1998 | Gillespie | |
| 5,921,572 A | 7/1999 | Bard et al. | |
| 5,944,154 A | 8/1999 | Pees et al. | |
| 5,954,167 A | 9/1999 | Richardson et al. | |
| 5,957,252 A | 9/1999 | Berthold | |
| 6,026,939 A | 2/2000 | Girvin et al. | |
| 6,029,958 A | 2/2000 | Larsson et al. | |
| 6,105,987 A | 8/2000 | Turner | |
| 6,119,830 A | 9/2000 | Richardson et al. | |
| 6,164,424 A | 12/2000 | Girvin et al. | |
| 6,213,263 B1 | 4/2001 | De Frenne | |
| 6,244,397 B1 | 6/2001 | Kars | |
| 6,253,889 B1 | 7/2001 | Shirley et al. | |
| 6,254,067 B1 | 7/2001 | Yih | |
| 6,267,400 B1 | 7/2001 | McAndrews | |
| 6,286,642 B1 | 9/2001 | Yi | |
| 6,334,516 B1 | 1/2002 | Shirley et al. | |
| 6,446,771 B1 | 9/2002 | Sintorn et al. | |
| 6,581,948 B2 | 6/2003 | Fox | |
| 6,604,751 B2 | 8/2003 | Fox | |
| 6,722,678 B2 | 4/2004 | McAndrews | |
| 6,991,076 B2 | 1/2006 | McAndrews | |
| 7,124,865 B2 | 10/2006 | Turner et al. | |
| 7,270,221 B2 | 9/2007 | McAndrews | |
| 7,299,906 B2 | 11/2007 | McAndrews | |
| 7,497,308 B2 | 3/2009 | McAndrews | |
| 7,568,563 B2 | 8/2009 | McAndrews | |
| 7,673,726 B2 | 3/2010 | McAndrews | |
| 7,690,666 B2 | 4/2010 | McAndrews | |
| 7,690,667 B2 | 4/2010 | McAndrews | |
| 7,694,987 B2 | 4/2010 | McAndrews | |
| 7,748,506 B2 | 7/2010 | McAndrews | |
| 2002/0130003 A1* | 9/2002 | Lisenker et al. | 188/267.2 |
| 2003/0213662 A1* | 11/2003 | Fox | 188/275 |
| 2006/0180419 A1 | 8/2006 | Lamoureux et al. | |
| 2008/0035439 A1 | 2/2008 | Fox | |
| 2009/0277732 A1 | 11/2009 | Trujillo et al. | |

FOREIGN PATENT DOCUMENTS

| | | |
|---|---|---|
| EP | 1 947 361 | 7/2008 |
| FR | 1 125 267 | 10/1956 |
| GB | 2348473 | 10/2000 |
| JP | 55082833 | 6/1980 |
| JP | 56116936 | 9/1981 |
| JP | 5 910 67 34 | 6/1984 |
| WO | WO 98/14718 | 4/1998 |
| WO | WO 99/31403 | 6/1999 |

OTHER PUBLICATIONS http://engineeringtoolbox.com/metal-alloys-densities-d_50.htm.*
English Translation of French Patent No. 1125267 to Gatter, dated Oct. 1956, cited in Office Action mailed Jun. 6, 2005.
Edelbrock Performance Products, www.edelbrock.com, archived Jul. 20, 1997, printed Sep. 11, 2007, pp. 1 & 2.
Edelbrock Performer IAS Shocks With Patented Inertia Active System, www.coolwheels.net/edelbroc.htm, archived Jul. 20, 1997, printed Sep. 11, 2007, p. 1.

* cited by examiner

BICYCLE SHOCK ABSORBER WITH SLIDABLE INERTIA MASS

RELATED APPLICATIONS AND INCORPORATION BY REFERENCE

The entireties of U.S. patent application Ser. No. 12/197,171, filed Aug. 22, 2008, and Ser. No. 12/134,116, filed Jun. 5, 2008, are hereby incorporated by reference herein and made a part of the present specification.

BACKGROUND

1. Field of the Inventions

The present application relates generally to vehicle suspension systems. More specifically, the present application relates to an improved shock absorber system to be incorporated into the suspension system of a bicycle.

2. Description of the Related Art

Bicycles intended for off-road use, i.e., mountain bikes, commonly include a suspension assembly operably positioned between the rear wheel of the bicycle and the frame of the bicycle. The suspension assembly typically includes a shock absorber configured to absorb forces imparted to the bicycle by bumps or other irregularities of the surface on which the bicycle is being ridden. However, an undesirable consequence of incorporating a suspension assembly in a bicycle is the tendency for the shock absorber to absorb a portion of the power output of a rider of the bicycle. In some instances, i.e. when the rider is standing, the proportion of power absorbed by the shock absorber may be substantial and may drastically reduce the efficiency of the bicycle.

Vehicle shock absorbers utilize inertia valves to sense rapid accelerations generated from a particular part of the vehicle. Inertia valves are also used to change the rate of damping in the shock absorber depending on the magnitude of the acceleration. As an example, the inertia valve assembly may be arranged to adjust the damping of the rear shock in accordance with accelerations that are generated by the body of the vehicle differently than it would adjust the damping of the rear shock for accelerations that are generated by the rear wheel of the vehicle.

One example of the type of shock absorber that utilizes an inertia valve to distinguish rider-induced forces from terrain-induced forces and is described in U.S. Pat. No. 6,604,751 B2. According to U.S. Pat. No. 6,604,751, the shock absorber of U.S. Pat. No. 6,604,751 is positioned between the swing arm and the main frame to provide resistance to the pivoting motion of the swing arm. The rear shock absorber includes a peripherally located fluid reservoir that is connected to the swing arm at a distance away from the shock body, and is hydraulically connected to the main shock body by a hydraulic hose. In one embodiment, the reservoir of U.S. Pat. No. 6,604,751 is connected to the swing arm portion of the bicycle above the hub axis of the rear wheel.

The inertia valve assembly of U.S. Pat. No. 6,604,751 discloses an inertia valve attempting to overcome the effects of external forces and manufacturing defects that inhibit the motion of the inertia valve with the use of one or more "Bernoulli Steps" on an interior surface of the inertia mass. Also, the peripherally located reservoir of U.S. Pat. No. 6,604,751 discloses a blowoff valve that allows for an increased flow rate after a minimum threshold pressure is exceeded inside the blowoff chamber. Typically, this will occur when the bicycle hits a severe bump. Further, the refill ports and the axial blowoff passages of the shock absorber of U.S. Pat. No. 6,604,751 are located on the top surface of the reservoir.

However, the blowoff valve of U.S. Pat. No. 6,604,751 is not adjustable. That is, no mechanism is provided for adjusting the opening threshold pressure of the blowoff valve. A rear shock absorber sold on the 2007 model year and 2008 model year Epic bicycle sold by the assignee of the present application, Specialized Bicycle Components, Inc., includes a main shock body and a reservoir. An inertia valve mechanism and a compression valve mechanism are provided in the reservoir. The compression valve mechanism includes a one-way valve having one or more shims that normally close one or more ports in a reservoir piston. The compression valve mechanism also includes a needle-and-orifice-type valve, or bleed valve, which includes a needle member that is movable via an external adjustment knob to vary an amount of fluid flow through the orifice. However, due to the location of the compression valve mechanism within the reservoir between the inertia valve and a floating piston, the adjustment rod that couples the needle member with the adjustment knob must pass through either the floating piston or the inertia mass. In the actual Epic shock absorber, the adjustment rod passes through the floating piston, which increases the complexity of manufacturing and assembling the shock absorber. Thus, the need exists for an improved rear inertia valve shock that provides advantageous adjustment features and is relatively easy and cost-effective to manufacture.

SUMMARY

According to certain arrangements, a bicycle damping assembly includes a damper tube having a first end portion, a second end portion and a side wall extending between said first end portion and said second end portion. The bicycle damping assembly additionally includes a piston rod that carries a first piston, with the first piston and the piston rod being capable of telescopic movement with respect to the damper tube. The assembly further comprises a seal head, which creates a seal between the first end portion of the damper tube and the piston rod; a reservoir chamber defined by the bicycle damping assembly, a fluid passage that extends between the compression chamber and the reservoir chamber and a compression damping circuit that regulates compression fluid flow between the compression chamber and the reservoir chamber. The compression damping circuit comprises a pressure-activated valve having a partition and an acceleration-activated valve having an inertia mass. In some arrangements, the inertia mass is configured to slidably move relative to a reservoir shaft. In other embodiments, the inertia mass comprises a main portion and at least one protective coating or layer configured to contact said reservoir shaft. In one embodiment, at least one protective coating or layer helps shield said main portion from contact with said reservoir shaft.

In certain configurations, the main portion of the inertia mass comprises brass. In other arrangements, the main portion of the inertia mass comprises at least one material having an alloy or metal with a relatively small size-to-weight ratio. In other embodiments, the at least one protective coating or layer comprises nickel (e.g., electroless nickel). In certain arrangements, the at least one protective coating or layer comprises chrome, ceramic, hardened steel and/or any other material. In some arrangements, the at least one protective coating or layer is applied to the main portion using a plating method (e.g., electroless plating, electroplating, etc.). In other embodiments, the at least one protective coating or layer comprises an electroless nickel plating. In some arrangements, the main portion and the at least one protective coating or layer are joined using an adhesive, a bonding agent, an interference press-fit connection, a threaded joint, another mechanical fastener and/or any other method or device. According to certain embodiments, a bicycle damping assembly includes a damper tube, a piston rod that carries a first piston, with the first piston and the piston rod capable of telescopic movement with respect to said damper tube. In one embodiment, the first piston cooperates with the damper tube to at least partially define a variable volume compression chamber. The bicycle damping assembly additionally comprises a reservoir tube having a first end portion, a second end portion and a side wall extending between the first end portion and the second end portion, wherein a portion of an interior space of the reservoir tube defining a reservoir chamber. The assembly further includes a fluid passage, which extends between the compression chamber of the damper tube and the reservoir tube such that the fluid passage communicates with an opening in the reservoir tube and a compression damping circuit within the reservoir tube that regulates compression fluid flow between the compression chamber and the reservoir chamber. In some arrangements, the compression damping circuit comprising a pressure-activated valve including a partition and an acceleration-activated valve including an inertia mass. In one embodiment, the inertia mass is configured to slidably move within said reservoir tube relative to a reservoir shaft. In certain embodiments, the inertia mass comprises a main portion and a carrier material, with the carrier material configured to contact the reservoir shaft when said inertia mass moves within the reservoir tube. In other arrangements, the main portion is secured to the carrier material so that the main portion is generally shielded from contact with the reservoir shaft.

In some embodiments, the main portion of the inertia mass comprises at least one dense alloy or metal. In one embodiment, the main portion of the inertia mass comprises brass. In certain arrangements, the carrier material comprises a hardened material. In other embodiments, the carrier material comprises hardened steel, chrome, nickel, ceramic and/or any other material. In some arrangements, the carrier material is joined to the main portion using an adhesive, a bonding agent, an interference press-fit connection, a threaded joint, other mechanical fastener and/or any other attachment method or device.

A preferred embodiment is a bicycle rear shock absorber, including a damper tube having a first end portion, a second end portion and a side wall extending between the first end portion and the second end portion. A piston rod carries a first piston. The first piston and the piston rod are capable of telescopic movement with respect to the damper tube. The first piston cooperates with the damper tube to at least partially define a variable volume compression chamber and the piston rod extends out of the first end portion of the damper tube. A seal head creates a seal between the first end portion of the damper tube and the piston rod. A remote reservoir tube has a first end portion, a second end portion and a side wall extending between the first end portion and the second end portion. The remote reservoir tube and the damper tube are not within one another. At least a portion of the remote reservoir tube defines a reservoir chamber. A fluid passage extends between the compression chamber and the reservoir chamber. The damper tube defines a first opening that permits fluid communication between the compression chamber and the fluid passage and the remote reservoir tube defines a second opening that permits fluid communication between the fluid passage and the reservoir chamber. A compression damping circuit within the remote reservoir tube regulates compression fluid flow between the compression chamber and the reservoir chamber. The compression damping circuit includes a pressure-activated valve including a partition and an acceleration-activated valve including an inertia mass. The partition is upstream from the inertia mass relative to a flow of compression fluid from the second opening to the reservoir chamber.

Another preferred embodiment is a bicycle rear shock absorber, including a damper tube and a piston rod that carries a first piston. The first piston and the piston rod are capable of telescopic movement with respect to the damper tube. The first piston cooperates with the damper tube to at least partially define a variable volume compression chamber. A reservoir tube has a first end portion, a second end portion and a side wall extending between the first end portion and the second end portion. A portion of an interior space of the reservoir tube defines a reservoir chamber. A fluid passage extends between the compression chamber of the damper tube and the reservoir tube, wherein the fluid passage communicates with an opening into the reservoir tube. A compression damping circuit within the reservoir tube regulates compression fluid flow between the compression chamber and the reservoir chamber. The compression damping circuit comprises a pressure-activated valve including a partition and an acceleration-activated valve including an inertia mass. An externally-accessible adjustment mechanism permits adjustment of the compression damping circuit. Both the opening into the reservoir tube and the externally-accessible adjustment mechanism are located at the first end portion of the reservoir tube.

Yet another preferred embodiment is a bicycle rear shock absorber, including a damper tube and a piston rod that carries a piston. The piston and the piston rod are capable of telescopic movement with respect to the damper tube. The first piston cooperates with the damper tube to at least partially define a variable volume compression chamber. A reservoir tube has a first end portion, a second end portion and a side wall extending between the first end portion and the second end portion. A portion of an interior space of the reservoir tube defines a reservoir chamber. A fluid passage extends between the compression chamber of the damper tube and the reservoir tube. The fluid passage communicates with an opening into the reservoir tube. A compression damping circuit within the reservoir tube regulates compression fluid flow between the compression chamber and the reservoir chamber. The compression damping circuit comprises a pressure-activated valve including a first partition and an acceleration-activated valve including an inertia mass. A movable second partition within the reservoir tube separates the reservoir chamber from a gas chamber. The inertia mass is located between the first partition and the movable second partition along an axis of the reservoir chamber.

Another preferred embodiment is a bicycle rear shock absorber, including a damper tube and a piston rod that carries a piston. The piston and the piston rod are capable of telescopic movement with respect to the damper tube. The piston cooperates with the damper tube to at least partially define a variable volume compression chamber. A portion of an interior space of a reservoir tube defines a reservoir chamber. A fluid passage extends between the compression chamber of the damper tube and the reservoir chamber of the reservoir tube. A partition is provided within the reservoir tube. A shaft is provided within the reservoir tube. An inertia mass is supported on the shaft and is movable relative to the shaft in response to an acceleration force above a threshold value acting on the reservoir tube. A compression damping fluid circuit that regulates compression fluid flow from the compression chamber to the reservoir chamber, includes a first compression damping flow path in which damping fluid passes through an acceleration-activated valve that is controlled by a position of the inertia mass, a second compression damping flow path in which damping fluid passes through a pressure-activated valve of the partition without passing through the shaft, and a third compression damping flow path in which damping fluid passes through the shaft without passing through the acceleration-activated valve and without passing through the pressure-activated valve of the partition.

Another preferred embodiment is a bicycle rear shock absorber, including a damper tube and a piston rod that carries a first piston. The first piston and the piston rod are capable of telescopic movement with respect to the damper tube, wherein the first piston cooperates with the damper tube to at least partially define a variable volume compression chamber. A reservoir body has a first end portion, a second end portion and a side wall extending between the first end portion and the second end portion. A portion of an interior space of the reservoir tube defines a reservoir chamber. A fluid passage extends between the compression chamber of the damper tube and the reservoir body. The fluid passage communicates with an opening into the reservoir body. An acceleration-activated damping circuit is within the reservoir body and includes an inertia mass movable along an axis. A pressure-activated damping circuit within the reservoir body regulates a compression fluid flow and a rebound fluid flow between the compression chamber and the reservoir chamber. The compression fluid flow within the reservoir body flows alongside the inertia mass and imparts a force on the inertia mass tending to move the inertia mass in a first direction along the axis and the rebound fluid flow within the reservoir body flows alongside the inertia mass and imparts a force on the inertia mass tending to move the inertia mass in a second direction along the axis.

Yet another preferred embodiment is a bicycle rear shock absorber, including a damper tube that defines a first diameter and a piston rod that defines a second diameter. The piston rod carries a piston. The piston and the piston rod are capable of telescopic movement with respect to the damper tube. The piston cooperates with the damper tube to at least partially define a variable volume compression chamber and at least partially define a variable volume rebound chamber. A reservoir chamber is defined by the shock absorber. Fluid is displaced to the reservoir chamber from the compression chamber during compression movement of the shock absorber. Fluid returns to the compression chamber from the reservoir chamber during rebound movement of the shock absorber. A ratio of the first diameter to the second diameter is between about 1.05:1 and about 1.75:1.

A preferred embodiment is a bicycle rear shock absorber, including a damper tube that defines a first diameter and a piston rod that defines a second diameter. The piston rod carries a piston. The piston and the piston rod are capable of telescopic movement with respect to the damper tube. The piston cooperates with the damper tube to at least partially define a variable volume compression chamber and at least partially define a variable volume rebound chamber. A reservoir chamber is defined by the shock absorber, wherein fluid is displaced to the reservoir chamber from the compression chamber during compression movement of the shock absorber, and wherein fluid returns to the compression chamber from the reservoir chamber during rebound movement of the shock absorber. The first diameter is between about 8 mm and about 12 mm-14 mm and a ratio of the first diameter to the second diameter is between about 1.05:1 and about 2.5:1.

Another preferred embodiment is a bicycle rear shock absorber including a main body portion. The main body portion includes a damper tube and a piston rod that carries a first piston. The first piston and the piston rod are capable of telescopic movement with respect to the damper tube. A gas spring tube is capable of being coupled to the piston rod and wherein the gas spring tube is slidably engaged with an external surface of the damper tube. A reservoir body portion is not within the main body portion. A connector couples the damper tube and the reservoir body portion, wherein the connector is configured such that the gas spring tube can be disconnected from the piston rod and slid along the damper tube until the gas spring tube at least partially overlaps the connector without disassembling the connector from the damper tube or the reservoir.

BRIEF DESCRIPTION OF THE DRAWINGS

These and other features, aspects and advantages of the present bicycle shock absorber are described below with reference to drawings of preferred embodiments, which are intended to illustrate, but not to limit, the present invention. The drawings contain twenty-one (21) figures.

DETAILED DESCRIPTION OF THE PREFERRED EMBODIMENTS

Figure 1:
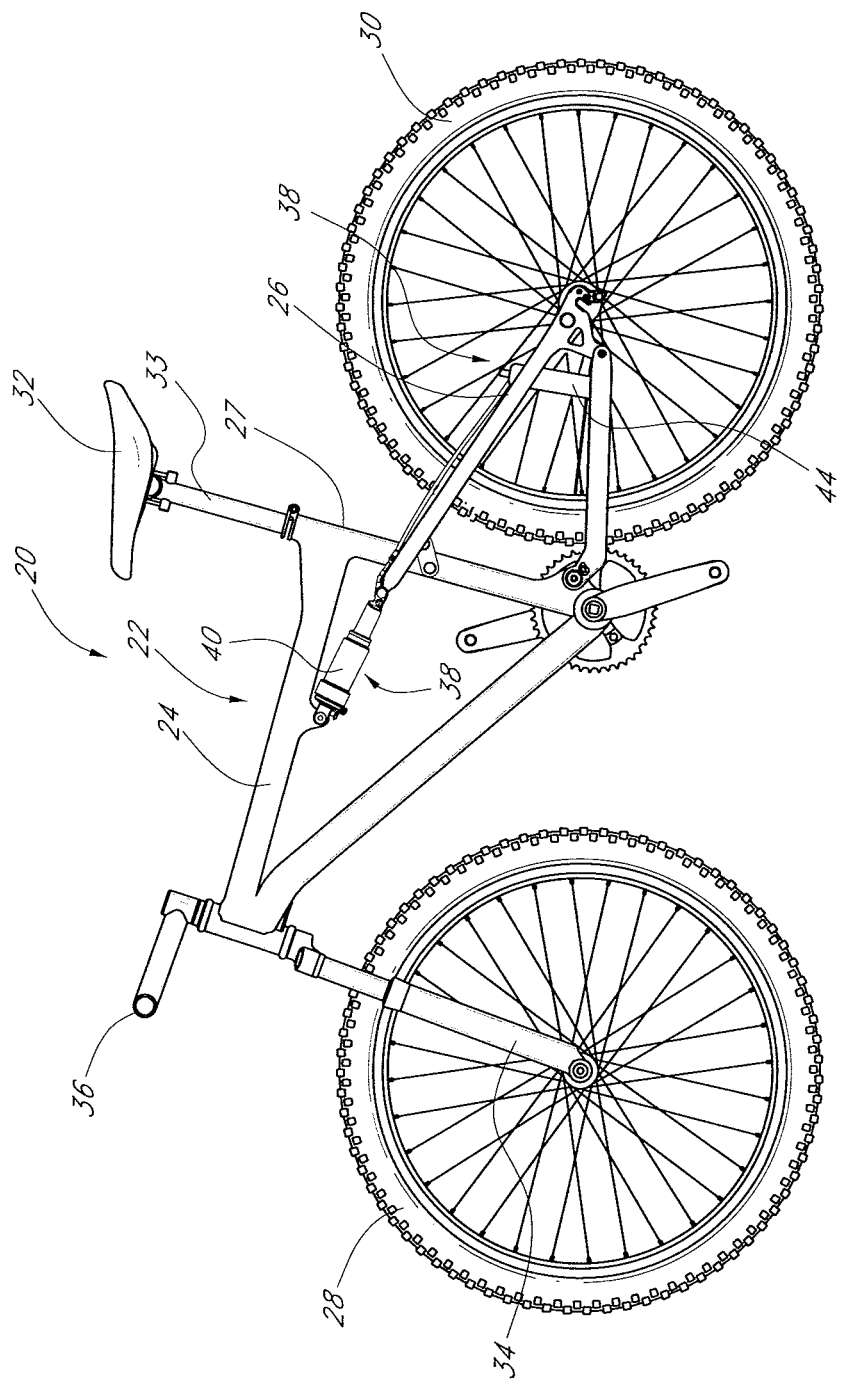
FIG. 1 is an elevation view of a bicycle including a preferred rear shock absorber, which includes an air spring and a damper.

Referring to FIG. 1, a bicycle 20 (e.g., a mountain bike) having a preferred embodiment of a rear suspension assembly including a rear suspension element, or shock absorber, is illustrated. The bicycle 20 includes a frame 22, preferably comprised of a generally triangular main frame portion 24 and an articulating frame portion, or subframe 26, which preferably is pivotally connected to the main frame portion 24. In the illustrated arrangement, the subframe 26 is an assembly of multiple linkage members pivotally connected to one another. The subframe 26 is pivotally connected to the main frame portion 24 (e.g., to the seat tube 27). The bicycle 20 also includes a front wheel 28 and a rear wheel 30. The rear wheel 30 is carried by the subframe 26. A saddle or seat 32, to provide support to a rider in a sitting position, is connected to the main frame 24 and, in particular, to the seat tube 27. In the illustrated arrangement, the seat 32 is connected to the main frame 24 through a seat post 33. However, in other arrangements, the seat 32 may be supported by another member or structure, such as the seat tube 27 itself, for example. The front wheel 28 is supported relative to the frame 22 by a front suspension fork 34. It is understood that in some embodiments, main frame portion 24 may not be generally triangular and/or may not have a seat tube which extends uninterrupted to the bottom bracket.

Positioned between the subframe 26 and mainframe 24 (preferably, a top tube of the mainframe 24) is a preferred embodiment of a rear shock 38. It is noted that, while the shock 38 disclosed herein is described in the context of its use as a rear shock absorber for an off-road bicycle, the applicability of the invention is not so limited. Aspects of the invention can be utilized in a front suspension unit, such as the bicycle fork 34, and other suitable applications, as well.

The rear shock 38 influences the pivoting motion of the subframe 26, providing a suspension spring force and a damping force in both compression and rebound motion. Preferably, the spring is an air spring arrangement, but coil springs and other suitable arrangements may also be used. Thus, the bicycle 20 illustrated in FIG. 1 includes the rear shock 38 operatively coupled between the rear wheel 30 and the frame 22. Advantageously, the rear shock 38 substantially reduces the transmission of impact forces imparted on the rear wheel 30 by the terrain to the operator of the bicycle.

Figure 2:
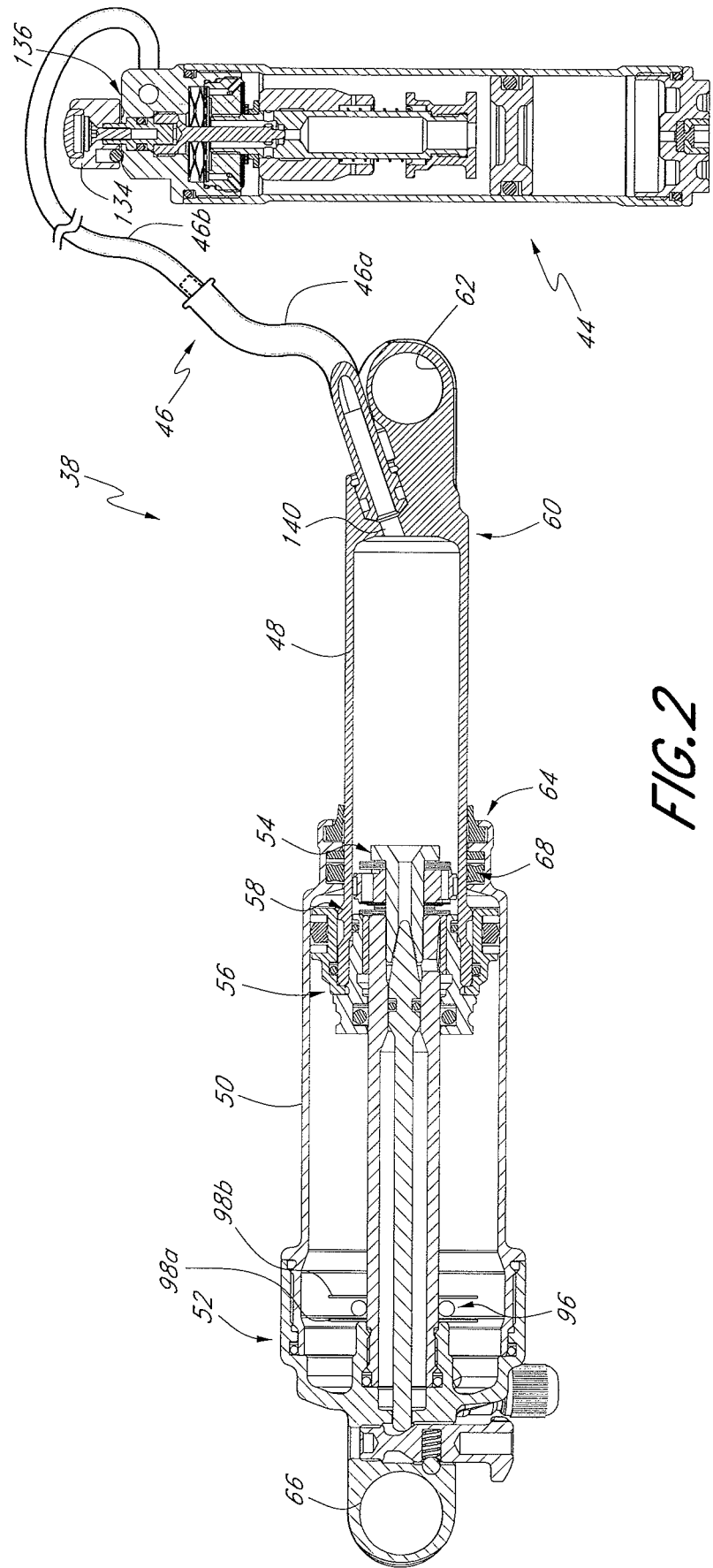
FIG. 2 is a cross-section of the rear shock absorber of FIG. 1. The shock absorber includes a main body portion and reservoir portion.

With additional reference to FIG. 2, the rear shock 38 desirably includes a primary unit or main body portion 40 and a remote unit or secondary or reservoir body portion 44. Note that, as illustrated, the reservoir body portion 44 may be located remote with respect to the main body portion 40. That is, the reservoir body portion 44 preferably is not located within the main body portion 40. In the illustrated arrangement, the main body portion 40 and the reservoir portion are coupled for fluid transfer via a tube assembly 46. As shown in FIG. 1, the main body portion 40 is coupled to the bicycle 20 separately from the reservoir body portion 44. The main body portion 40 preferably extends from the main frame 24 (e.g., the top tube) at one end to the subframe 26 (e.g., the seat stays) at the other end, and extends underneath the top tube, along the axis of the top tube. Preferably, the reservoir body portion 44 is connected to the bicycle 20 at a location near the rotational axis of the rear wheel 30. In the illustrated arrangement, the reservoir body portion 44 is coupled to one of the seat stays, near the rearward end portion thereof. Preferably, an upper end of the reservoir body portion 44 is coupled to the seat stay, and the reservoir body portion 44 extends below the seat stay. In the illustrated arrangement, an axis of the reservoir body portion 44 is substantially perpendicular to the seat stay and generally vertical when the bicycle 20 is standing upright on a horizontal surface. However, in the illustrated arrangement, the reservoir body portion 44 is not exactly vertical.

Preferably, the tube assembly 46 includes a tube portion 46a and a hose portion 46b. The tube portion 46a is constructed from a relatively rigid material and generally defines an "S" shape, one end of which is coupled to the main body portion 40 by a bayonet-type connection. Such a connection securely couples the tube portion 46a to the main body portion 40 in an axial direction of the connection, but permits relative rotation between the tube portion 46a and the main body portion 40. Such an arrangement advantageously eases the assembly of the shock absorber 38 to the bicycle 20 by permitting relative movement of the main body portion 40 and the tube assembly 46. In addition, the S-bend shape of the tube portion 46a advantageously permits partial disassembly of an air spring portion of the main body portion 40 for routine servicing, without disassembly of the damper portion, as is described in more detail below. The other end of the tube portion 46a is coupled to a first end of the hose portion 46b by any suitable connector, such as a bayonet-type connector, for example. Preferably, the hose portion 46b is constructed of a relatively flexible hose. The second end of the hose portion 46b is coupled to the reservoir body portion 44 by any suitable connector, such as a bayonet-type connector, for example. The flexible hose portion 46b accommodates relative movement between the main frame 24 and the subframe 26.

Although such an arrangement is presently preferred, in another arrangement, the reservoir body portion may be located within the main body portion, such as in a front fork, for example. In some arrangements, the reservoir body portion is directly connected to the main body portion external to the main body portion and, in other arrangements, the reservoir body portion may be secured to the bicycle separately, although relatively close to the main body portion. For example, the reservoir body portion may be coupled near the rear wheel axle (or axis of rotation) and the main body portion may extend from the main frame 24 to a location near the rear wheel axis of rotation. Furthermore, the connection between the main body portion 40 and the reservoir body portion 44 can be achieved by any suitable means, such as by, but not limited to, threading or press-fitting the reservoir body portion 44 directly into the reservoir body portion 44 or the main body portion 40. Alternatively, the reservoir body portion 44 can be monolithically formed with the main body portion 40.

As is discussed in more detail below, the shock absorber 38 preferably includes an inertia valve within the damping system of the shock absorber 38. The inertia valve described herein may advantageously be configured to be highly responsive to changes in the acceleration of the rear shock 38, or certain portions of the rear shock 38, such as the reservoir body portion 44, for example. Further, in some embodiments, the inertia valve components described herein are relatively uncomplicated and cost-effective to produce, resulting in low manufacturing costs and few production errors. In particular, certain preferred embodiments are configured to reduce assembly issues associated with tolerance stack-ups between the individual components, especially tolerance stack-ups in concentricity dimensions. As discussed, the rear shock 38 preferably includes an inertia valve that varies the damping rate of the rear shock 38 depending upon the direction of an acceleration of the inertia valve. With such an arrangement, the inertia valve can distinguish between forces imparted on the shock absorber 38 that originate from the rider of bicycle from forces imparted on the shock absorber 38 by bumps in the path of travel. Performance of the bicycle is improved when forces generated by the rider are more firmly (or quickly) damped and forces imparted on the rear wheel 20 by bumps in the road are damped more softly (or slowly). This reduces or prevents shock absorber movement resulting from rider-induced forces, such as by pedaling, while allowing the shock absorber 38 to compensate for forces imparted on the rear wheel 20 by uneven terrain. It is understood that in some embodiments, the shock absorber will move very little in response to rider induced pedal forces.

A preferred embodiment of the rear shock 38 is illustrated in FIGS. 2-14. Generally, the rear shock 38 comprises a spring, a main damper assembly, and a reservoir. Preferably, the main body portion 40 is generally comprised of a hydraulic fluid body portion or damper tube 48, a spring tube or air sleeve 50 closed by a seal head or an end cap 52, a main body damping piston 54, and a damper tube cap or spring piston 56.

The damper tube 48 may be cylindrical in shape and includes an open end portion 58 and a lower closed end portion 60. The lower closed end portion 60 has a lower eyelet 62 that is used for connecting the shock 38 to a portion of the bicycle 20 of FIG. 1, such as the subframe portion 26, for example. The closed end portion 60 or lower eyelet 62 may be referred to herein as the "lower" end or eyelet as a matter of convenience because the end portion 60 coupled to the subframe 26 is often relatively lower on the bicycle than the other end portion of the shock 38 coupled to the main frame 24. However, the term as used herein is not intended to be limiting.

The air sleeve 50 may also be cylindrical in shape. The air sleeve 50 includes an open end 64 and the opposite, upper end is closed by the end cap 52. The end cap 52 of the air sleeve 50 includes an upper eyelet 66 that is used to connect the rear shock 38 to the seat tube 27 (or other suitable portion) of the bicycle 20. The closed end portion 52 or eyelet 66 may be referred to herein as the "upper" end or eyelet as a matter of convenience because the end portion 52 coupled to the main frame 24 is often relatively higher on the bicycle than the other end portion of the shock 38 coupled to the subframe 26. However, the term as used herein is not intended to be limiting.

The open end 64 of the air sleeve 50 slidingly receives the damper tube 48. In this configuration, the air sleeve 50 and the damper tube 48 are configured for telescopic movement relative to one another between the main frame portion 24 and the subframe portion 26 of the bicycle 20. Thus, the shock absorber 38 is capable of varying in length to accommodate relative movement of the main frame portion 24 and the subframe portion 26 of the bicycle. Upward movement of the rear wheel 30 (and subframe 26) tending to reduce the length of the shock 38 is usually referred to as compression movement or, simply, compression. Downward movement of the rear wheel 30 (and subframe 26) tending to increase the length of the shock 38 is usually referred to as rebound movement, or rebound, of the shock 38.

Figure 3:
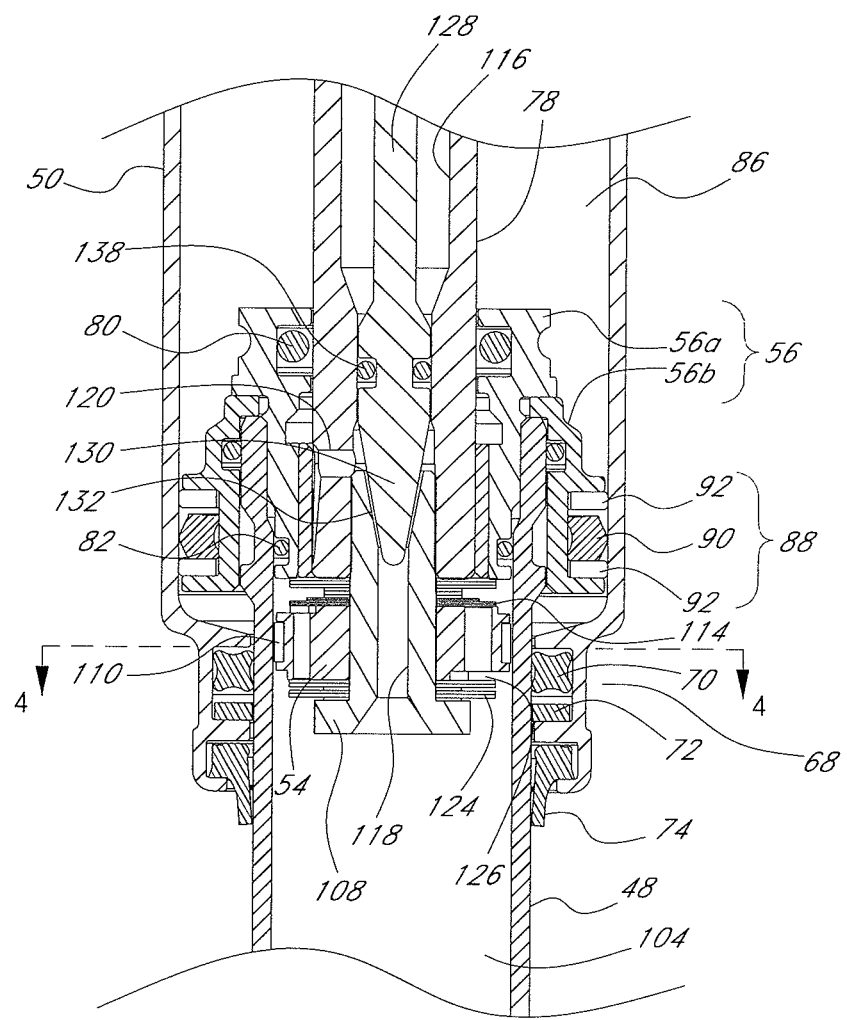
FIG. 3 is an enlarged cross-section of a main body portion of the shock absorber of FIG. 2, showing a main body damping piston in an uncompressed position.

FIG. 1 illustrates an embodiment of the rear shock 38 mounted in its preferred configuration to the main frame portion 24 (using upper eyelet 66) and the subframe portion 26 (using lower eyelet 62) of the bicycle 20. With reference to FIGS. 1 and 3, in the illustrated arrangement, the mounting axes of the upper eyelet 66 and the lower eyelet 62, respectively, are not aligned. The mounting axis of the lower eyelet 62 is rotated about the longitudinal axis of the shock 38 with respect to the mounting axis of the upper eyelet 66 because, as illustrated in FIG. 1, the subframe mounting tab 26a is positioned at a different orientation as compared to the mounting axis on the main frame portion 24. However, while the orientation of the mounting axis of the lower eyelet 62 is not aligned or coplanar with the orientation of the mounting axis of the upper eyelet 66 in the embodiment illustrated in FIGS. 1-3, the respective orientations of the eyelets 52, 58 is not so limited. The mounting axes of the eyelet 66, 58 can be positioned at any relative orientation suitable for the frame to which the rear shock 38 is mounted.

In another embodiment, the orientation of the rear shock 38 may be changed such that the damper tube 48 is attached to the seat tube 27 or other portion of the main frame 24 (at the "lower" eyelet 62) while the air sleeve 50 is attached to the subframe 26 (at the "upper" eyelet 66). However, such an arrangement is not presently preferred.

The air sleeve 50 has a seal assembly 68 positioned at the open end 64 thereof, forming a substantially airtight seal between outer surface of the damper tube 48 and the inner surface of the air sleeve 50. With reference to FIG. 3, in the illustrated embodiment, the seal assembly 68 is comprised of an annular seal body 70 having a substantially rectangular cross-section that is located above, or inboard relative to the open end 64, of an annular bearing 72. A wiper 74 is located adjacent the open end 64 of the air sleeve 50 to prevent dust, dirt, rocks, and other potentially damaging debris from entering into the air sleeve 50 as the damper tube 48 moves into the air sleeve 50.

The main damper piston 54 is positioned within and slides relative to the inner surface of the damper tube 48. The piston 54 is connected to the end cap 52 by a piston rod 78, fixing the piston 54 for motion within the air sleeve 50.

As described above, the damper tube cap 56 is fixed to the open end portion 58 of the damper tube 48. The damper tube cap 56 supports the piston rod 78 such that the piston rod 78 is able to slide within a central opening in the damper tube cap 56. Thus, the damper tube cap 56 functions as a seal head of the damper tube 48. The damper tube cap 56 accordingly slides within the inner surface of the air sleeve 50 and, thus, also functions as a piston of the air spring. Because the damper tube cap 56 is easier to manufacture in two portions, the damper tube cap 56 preferably is comprised of an upper cap portion 56a and a lower cap portion 56b (relative to the positions shown in FIG. 3). After the lower cap portion 56b is inserted over the end of the damper tube 48, the upper cap portion 56a is preferably fixed to the damper tube 48 by threading the upper cap portion 56*a* into threads formed on the inside surface of the damper tube 48. The upper cap portion 56*a* and lower cap portion 56*b* are configured such that, when the upper cap portion 56*a* is attached to the damper tube 48 as described above, the lower cap portion 56*b* will also be firmly attached to the damper tube 48 and relative axial movement therebetween is prevented. Annular seals 80 and 82 are preferably used to prevent hydraulic oil from the damper tube 48 from leaking into a primary air chamber 86 between the damper tube cap 56 and the piston rod 78 and between the damper tube cap 56 and the damper tube 48, respectively. Similarly, the annular seals 80, 82 also prevent the gas located in the primary air chamber 86 from leaking into the damper tube 48.

A seal assembly 88 is preferably carried by the damper tube cap 56. The seal assembly 88 is preferably comprised of a seal member 90, which is preferably an annular seal having a substantially square cross-section and is positioned between a pair of bearings 92, and a bushing 94. Together, the seal member 90 and the bushing 94 create a seal between the damper tube cap 56 and the air sleeve 50 and between the damper tube cap 56 and the piston rod 78, respectively, while allowing the piston rod 78 to translate relative to the damper tube cap 56. Note that the cross-section of the seal member 90 may be any suitable shape, such as round or rectangular, for example.

A bottom-out bumper 96 is desirably positioned near the closed end portion 52 of the air sleeve 50 to prevent direct metal to metal contact between the closed end portion 52 and the damper tube cap 56 of the damper tube 48 upon full compression of the rear shock 38. The bottom-out bumper 96 is preferably formed from a soft, pliable, and resilient material, such as rubber. The bottom-out bumper 96 is positioned between two washers 98*a*, 98*b*, which hold the bottom out bumper 96 in position next to the closed end portion 52. Washers 98*a*, 98*b* can also be formed from a soft, pliable, and resilient material, such as rubber, or by any other suitable material. Similarly, an annular rebound (or top-out) bumper (not shown) may be positioned around the outside of the damper tube 48 below the damper tube cap 56, but above the bearings 64. If provided, the rebound bumper preferably prevents metal to metal contact between the bottom portion of the damper tube cap 56 and the air sleeve 50, and buffers the magnitude of the impact between the two components, at the end of the rebound motion of the rear shock 38.

Figure 5:
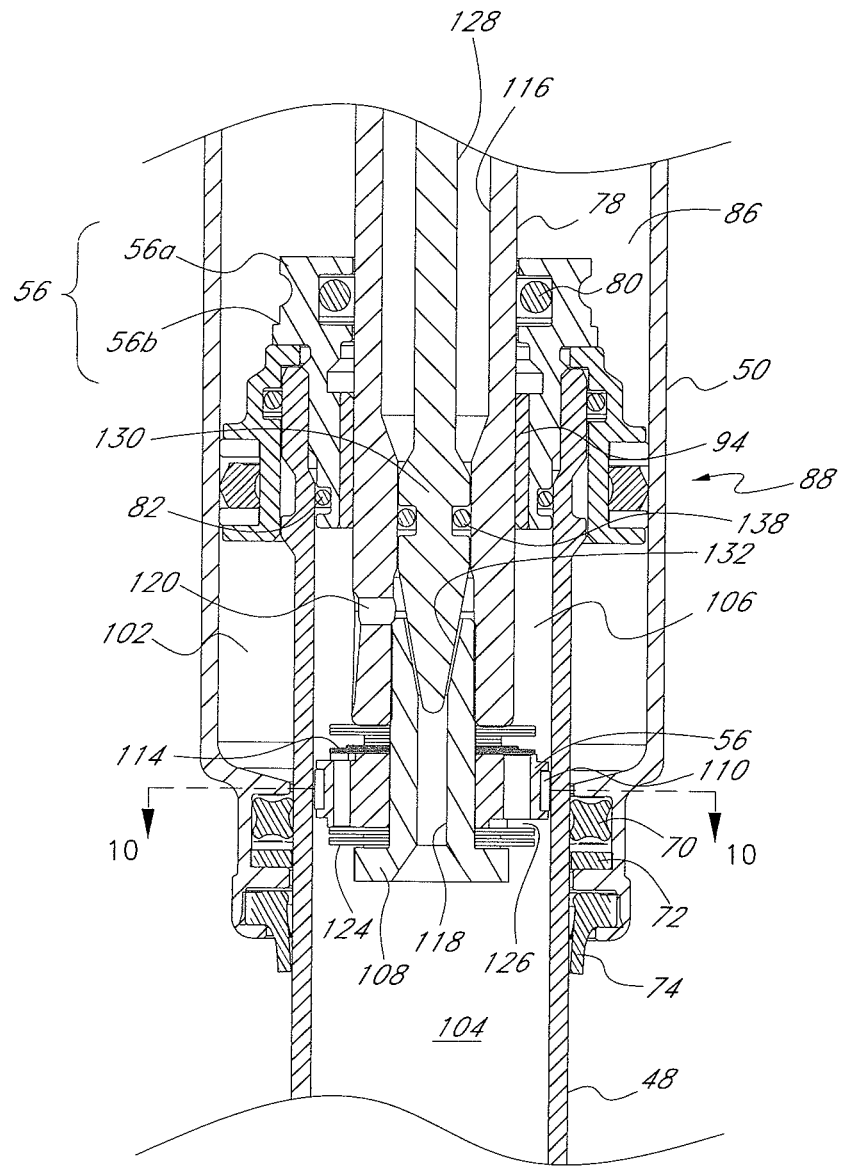
FIG. 5 is an enlarged cross-section of the main portion of the shock absorber of FIG. 2, showing the main body damping piston in a partially compressed position.
Figure 6:
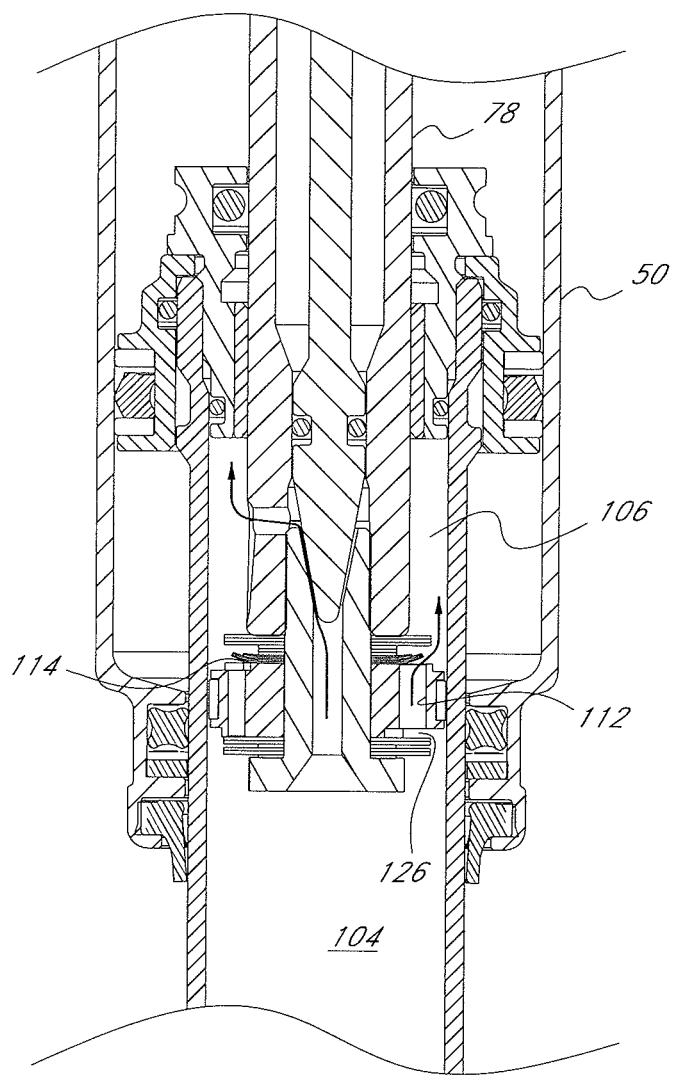
FIG. 6 is an enlarged cross-section of the main portion of the shock absorber of FIG. 2, showing the flow path of hydraulic fluid through the main body damping piston during the compression motion of the rear shock.

With particular reference to FIGS. 5 and 6, the space between the damper tube cap 56 and the seal assembly 68 defines a secondary air chamber 102, which may be referred to as a "negative spring" chamber. Air that fills the secondary air chamber 102 exerts a pressure that tends to compress the shock 38 or resists the rebound motion of the rear shock 38. In conjunction, the primary air chamber 86 and the secondary air chamber 102 form the suspension spring portion of the rear shock 38.

The primary air chamber 86 is defined as the space between the closed end portion 52 of the air sleeve 50 and the damper tube cap 56. Air held within the primary air chamber 86 exerts a biasing force tending to extend the rear shock 38 or resist compression motion of the rear shock 38. As will be appreciated, the primary air chamber 86 is primarily responsible for the spring characteristics of the shock 38 throughout the majority of the range of travel of the shock 38. The secondary air chamber 102 is intended to assist the initial compression of the shock 38 to overcome the initial resistance to movement caused by, for example, the various seal assemblies of the shock 38.

Figure 7:
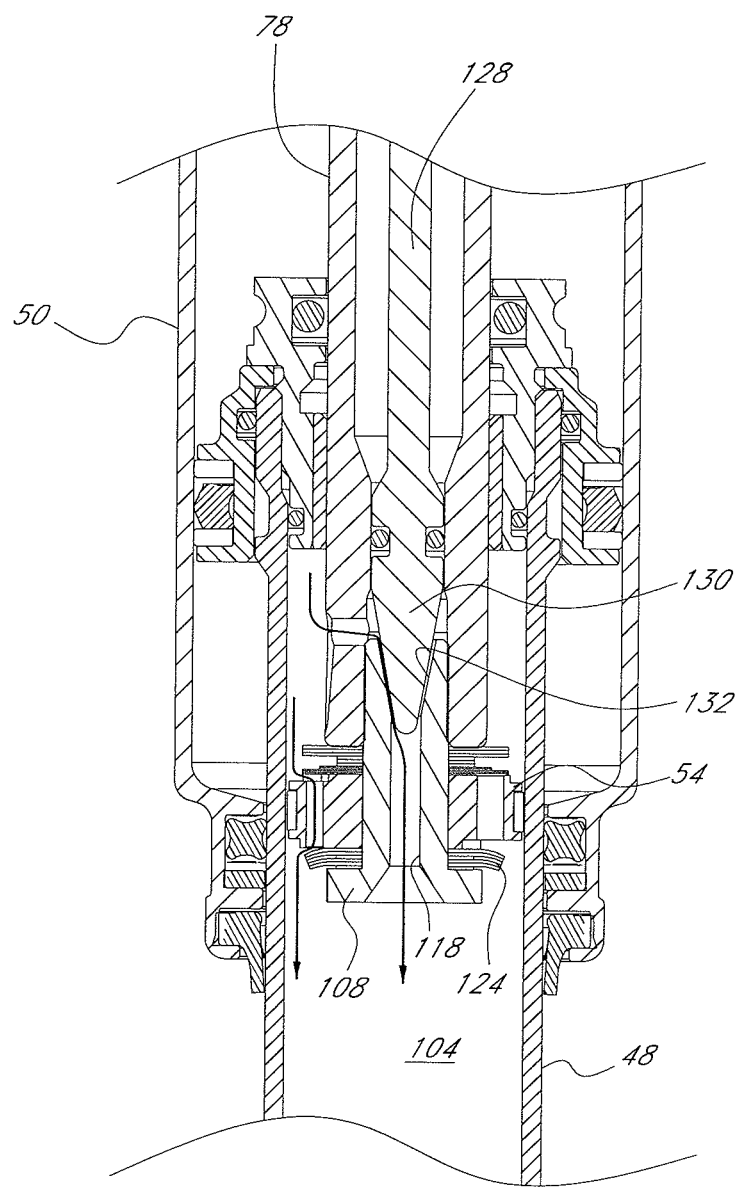
FIG. 7 is an enlarged cross-section of the main portion of the shock absorber of FIG. 2, showing the flow path of hydraulic fluid through the main body damping piston during the rebound motion of the rear shock.

The damper assembly of the rear shock 38 is described hereinafter with reference to FIGS. 2-7. The interior space or chamber of the damper tube 48 is divided by the piston 54 into two portions. In the illustrated arrangement, the first portion is the compression chamber 104 and the second portion is the rebound chamber 106. The compression chamber 104 is generally formed by the space between the piston 54 and the closed end portion 60 of the damper tube 48. The compression chamber 104 decreases in volume during compression motion of the rear shock 38 and increases in volume during the rebound motion of the rear shock 38. The rebound chamber 106 is generally formed by the space between the piston 54 and the damper tube cap 56. The rebound chamber 106 increases in volume during the compression motion of the rear shock 38 and decreases in volume during the rebound motion of the rear shock 38. In addition, the piston rod 78 is present within the rebound chamber 106. As the piston 54 moves further into the damper tube 48, the piston rod 78 occupies an increased portion of the interior of the damper tube 48. Thus, the rebound chamber 106 does not increase by the same volume as the compression chamber 104 decreases during compression, due to the presence of the piston rod 78 within the rebound chamber 106. As a result, damping fluid must be displaced to the reservoir body portion 44 upon compression and then replaced to the main body portion 40 during rebound. As noted above, FIG. 3 illustrates an embodiment of the rear shock 38 wherein the piston 54 is in an uncompressed state. FIGS. 5, 6 and 7 illustrate a partially compressed position of the rear shock 38.

As shown in FIG. 3, preferably, a hollow threaded fastener or pin 108 fixes the piston 54 to the piston rod 78. A seal 110, preferably of an annular type having a rectangular cross-section, is carried by the piston 54 and seals the piston 54 with the inner surface of the damper tube 48.

Figure 4:
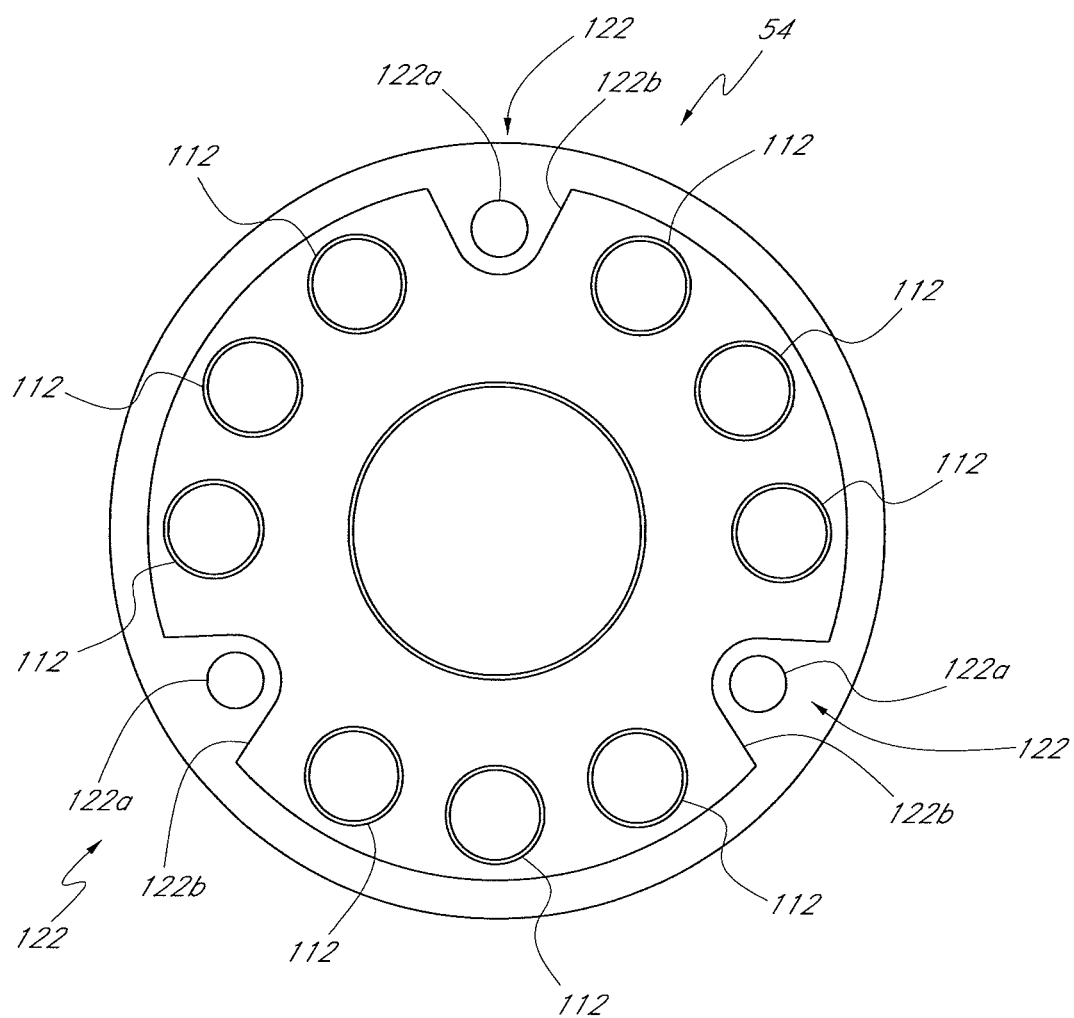
FIG. 4 is a cross-section of the main body damping piston taken along line 4-4 of FIG. 3.

In the illustrated embodiment, the piston 54 preferably includes a plurality of compression flow passages 112. Each of the compression flow passages 112 pass through the piston 54 in the axial direction and, preferably, circular in cross-sectional shape. In one preferred arrangement, nine compression flow passages 112 are provided in three groups of three passages 112, as shown in FIG. 4. Alternatively, each group of compression passages 112 could comprise a single, arcuate (or kidney-shaped) passage. However, the presently illustrated arrangement advantageously provides for a similar amount of fluid flow, while permitting the passages 112 to be formed by a simple drilling operation, rather than a more time consuming and expensive milling operation, which would be required for an arcuate passage.

In various embodiments, the compression flow passages 112 may cumulatively perforate and, hence, allow the passage of hydraulic fluid through 10% to 60%, 15% to 40%, or 20% to 35% of the working area of the piston 54. As used herein, "working area" means the area defined within the periphery of the piston 54 in a plane perpendicular to the longitudinal axis. In the illustrated arrangement, the working area substantially corresponds to a cross-sectional area of the interior space of the damper tube 48. In the case of the piston 54, the longitudinal axis is aligned with the piston rod 78. The compression flow passages 112 may cumulatively perforate and allow the passage of hydraulic fluid through at least 10%, 15%, 20%, 25%, 30%, 35%, 40%, 45%, 50%, 55% and 60% of the working area.

The compression flow passages 112 are covered on the rebound chamber 106 side of the piston 54 by a shim stack 114. The shim stack 114 can be made up of one or more flexible, preferably annular, shims. The shim stack 114 preferably operates as a one-way check valve. That is, the shim(s)

114 deflect to allow a flow path of preferably minimal restriction through the compression flow passages 112 during compression motion of the rear shock 38, while preventing flow through the compression flow passages 112 during the rebound motion of the rear shock 38. In the illustrated configuration, the shim stack 114 is made up of multiple shims having any suitable characteristics (e.g., thicknesses, stiffnesses, and diameters) that preferably allow the shim stack 114 to be easily deflected to allow hydraulic fluid to flow with minimal restriction through compression flow passages 112 during compression motion of the rear shock 38. In addition, the relatively large collective area of the passages 112, which results in a relatively large fluid force acting on the shim stack 114, also assists in allowing flow with minimal restriction. The substantially unrestricted flow path of hydraulic fluid (represented by arrows) through the compression flow passages 112 and the deflection of the shim stack 114 during the compression motion of the rear shock 38 are illustrated in FIG. 6.

Figure 8:
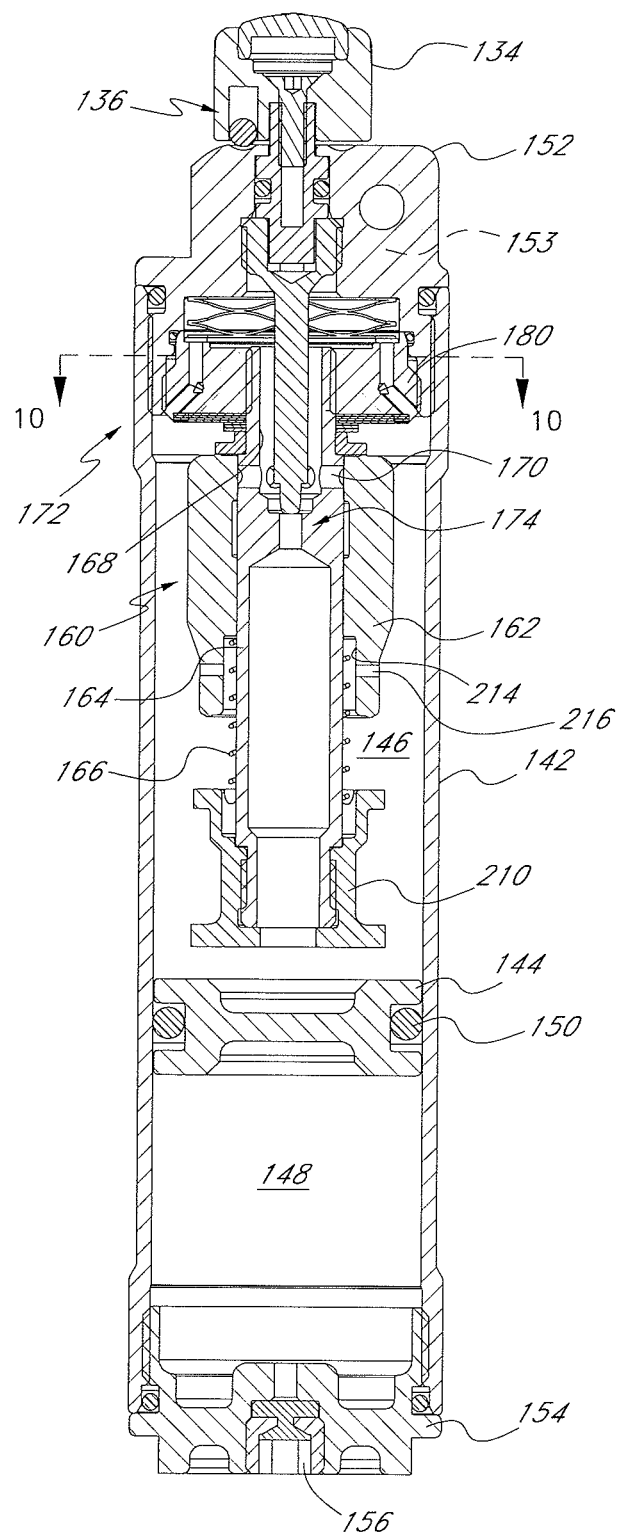
FIG. 8 is a cross-section of the reservoir of the shock absorber of FIG. 1 showing an inertia valve in a closed position.
Figure 9:
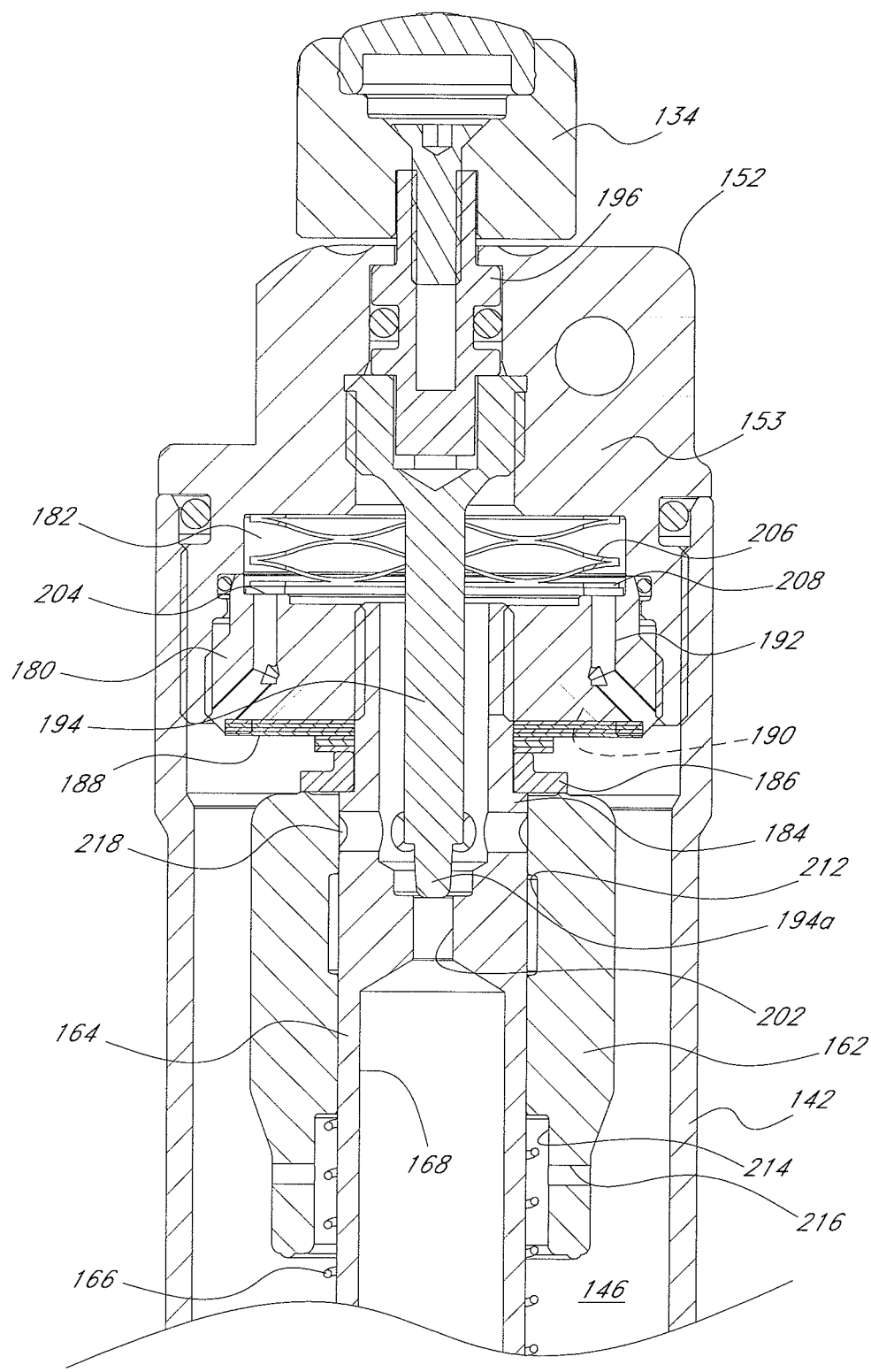
FIG. 9 is an enlarged cross-section of the reservoir of FIG. 8 showing the inertia valve in a closed position.
Figure 10:
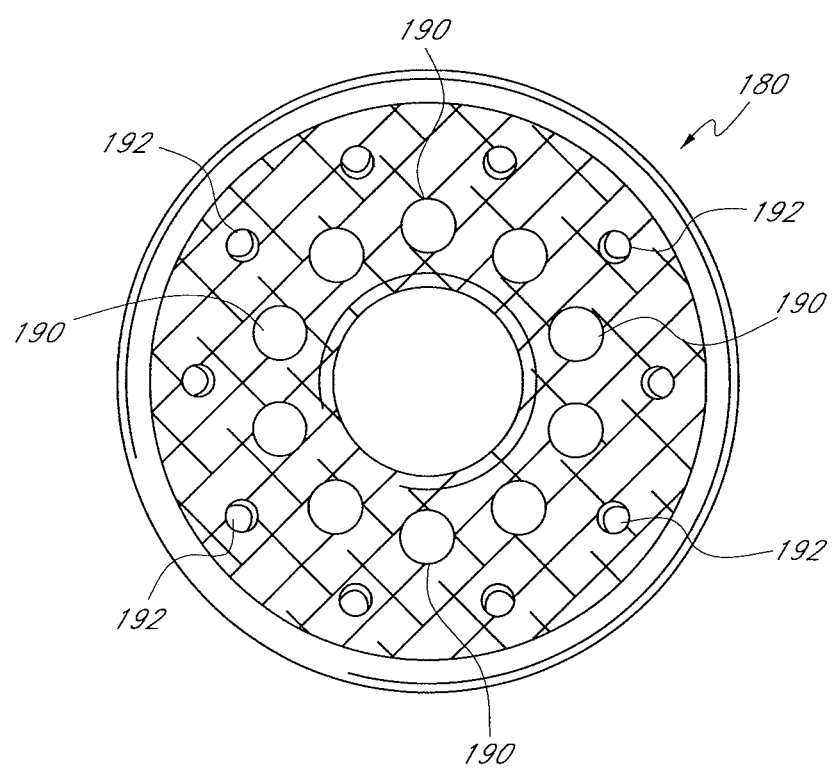
FIG. 10 is a cross-section of a partition of the reservoir of FIG. 8 taken along line 10-10 of FIG. 9.

In addition to the compression flow through the compression flow passages 112, compression flow preferably is also permitted at least through an additional compression flow path. For example, in the illustrated arrangement, the piston rod 78 defines a central passage 116 therethrough. The central passage 116 is in communication with the compression chamber 104 through a passage 118 of the hollow pin 108. Further, the central passage 116 is in communication with the rebound chamber 106 through a radial port 120 in the piston rod 78. FIG. 8 also illustrates the flow of hydraulic fluid from the compression chamber 104, through the port 120 in the piston rod 78, into the rebound chamber 106. For this flow path, the hydraulic fluid flows from the compression chamber 104 through the hollow pin 108 and a central passage 116 of the piston rod 78 before flowing out of the port 120 and into the rebound chamber 106. This flow path may be referred to as a pressure-activated flow path because fluid flow through the flow path will occur in response to a pressure differential between the compression chamber 104 and the rebound chamber 106.

The piston 54 of the illustrated embodiment also comprises a plurality of rebound flow passages 122, preferably three, extending in the axial direction through the piston 54. Each of the rebound flow passages 122 preferably includes an axial throughhole portion 122a and a radial channel portion 122b. The radial channel portions 122b are formed on the rebound side of the piston 54 and permit fluid to bypass the compression shim stack 114 during the rebound motion of the rear shock 38. As such, the hydraulic oil flows through both the radial channels 122b and the axial throughholes 122a during the rebound motion of the rear shock 38. A notable advantage of this configuration is that the size of the compression flow passages 112 can be increased to permit a very high flow rate of hydraulic fluid through the piston 54 during the compression motion without otherwise limiting the size of the rebound flow passages 122 and, hence, the amount of fluid that can flow through the rebound flow passages 122 that may otherwise be required if the radial channels 122b were not present. This also permits the piston 54 to be formed from a single piece of material, instead of a multi-piece or cup design.

In certain embodiments, the rebound flow passages 122 may cumulatively perforate and, hence, allow the passage of hydraulic fluid through 2% to 25%, 5% to 15%, or 5% to 10% of the working area of the piston 54. The rebound flow passages 122 may cumulatively perforate and, hence, allow the passage of hydraulic fluid through no more than 2%, 5%, 10%, 15%, or 25% of the working cross-sectional area of the piston 54.

A rebound shim stack 124, which can be made up of one or more flexible shims, preferably is positioned on the compression side of the piston 54 and covers the rebound passages 122. The rebound shim stack 124 deflects to allow, but to control the amount of, flow through the rebound flow passages 122 during the rebound motion of the rear shock 38. As such, the rebound shim stack 124 provides resistance to the flow of hydraulic fluid through the piston 54 during the rebound motion of the rear shock 38. The rebound shim stack 124 also prevents flow through the rebound flow passages 122 during the compression motion of the rear shock 38, but is preferably configured not to obstruct the flow of hydraulic oil through the compression flow passages 112 during compression motion. For example, in the illustrated arrangement, the piston 54 includes recesses 126 on the compression chamber 104 side that incorporate the openings of the compression flow passages 112. The recesses 126 permit compression flow through the compression flow passages 112 from the compression chamber 104 even when the rebound shim stack 124 is closed.

FIG. 7 illustrates the flow path of hydraulic fluid (represented by arrows) from the rebound chamber 106, through the rebound flow passages 122, to the compression chamber 104 during the rebound motion of the rear shock 38. In addition, FIG. 7 illustrates the deflection of the shim stack 124, which permits flow through the rebound passages 122 during the rebound motion of the rear shock 38.

FIG. 7 also illustrates the flow of hydraulic fluid from the rebound chamber 106, through the port 120, the central passage 116 of the piston rod 78, and the passage 118 of the hollow pin 108 into the compression chamber 104 during rebound motion of the rear shock 38. The port 120 through the piston rod 78 provides a passage through which hydraulic fluid may flow between the central passage 116 and the rebound chamber 106 when the rear shock 38 is partially to fully compressed. When the rear shock 38 is in its substantially uncompressed position, as illustrated in FIG. 3, the bushing 94 blocks the port 120 to substantially prevent the hydraulic fluid from flowing through the port 120 into the rebound chamber 106 or central passage 116. However, in some arrangements, the port 120 may be positioned or otherwise configured such that fluid flow is permitted through the port 120 even when the rear shock 38 is in the uncompressed position.

In the illustrated arrangement, an adjustment mechanism is provided that permits the flow rate through the port 120 to be varied or adjusted. For example, an adjustment rod 128 extends through the central passage 116 of the piston rod 78. The adjustment rod 128 preferably is configured to alter the damping force in the rear shock 38 by altering the amount of fluid that can flow through the port 120 upon compression motion and rebound motion. This is achieved by adjusting the adjustment rod 128 such that a needle portion or tip 130 of the adjustment rod 128 partially or, in some cases, fully blocks a valve seat portion 132 of the passage 118 of the hollow pin 108, thus restricting or, in some arrangements, fully preventing fluid from flowing through the port 120. The tip 130 and valve seat 132 include corresponding tapered surfaces and, thus, function as a needle-and-orifice-type adjustable valve. However, other suitable types of valves may be used in addition or in the alternative.

Furthermore, because in the configuration of the main body portion 40 illustrated in FIGS. 2-7, the compression flow passages 112 allow significantly more flow volume therethrough as compared to the rebound flow passages 122, adjustments to the volume of fluid that is permitted to flow through port 120 more significantly affects the rebound motion than the compression motion of the rear shock 38. Thus, while adjustment of the adjustment rod 128 alters fluid flow from the compression chamber 104 to the rebound chamber 106 during both compression motion and rebound motion, the adjustment rod 128 more significantly adjusts the fluid flow from the compression chamber 104 to the rebound chamber 106 during the rebound motion of the rear shock 38. The rebound damping, as compared to the compression damping, is more greatly affected by the adjustment of the adjustment rod 128 for the following reason. For the sake of example, ignoring the flow restriction provided by the various shim stacks, the compression flow passages 112 are desirably configured to allow a greater flow rate therethrough as compared to the rebound flow passages 122. This is because, as discussed above, the cumulative size of the openings comprising the compression flow passages 112 is desirably significantly greater than the cumulative size of the openings comprising the rebound flow passages 122. Further, the size of the opening comprising the port 120 is preferably much less than the cumulative size of the openings comprising the compression flow passages 112. In certain embodiments, the size of the opening comprising the port 120 can be 2% to 30%, 5% to 25%, or 10% to 20% of the cumulative cross-sectional area of the openings comprising the compression flow passages 112. In certain embodiments, the size of the opening comprising the port 120 is no more than 30%, 25%, 15%, 10%, or 5% of the cumulative cross-sectional area of the openings comprising the compression flow passages 112. Thus, the additional flow through the port 120 does not significantly increase the flow from the compression chamber 104 to the rebound chamber 106 during the compression motion of the rear shock 38.

Similarly, the size of the opening comprising the port 120 is preferably less than the cumulative cross-sectional area of the openings comprising the rebound flow passages 122. In certain embodiments, the cross-sectional area of the opening comprising the port 120 can be approximately 15% to approximately 35% of the cumulative cross-sectional area of the openings comprising the rebound flow passages 122. In certain embodiments, the cross-sectional area of the opening comprising the port 120 is no more than 25% of the cumulative cross-sectional area of the openings comprising the rebound flow passages 122. In sum, because the ratio of the size of the port 120 to the size of the openings comprising the rebound flow passages 122 is greater than the ratio of the size of the port 120 to the size of the openings comprising the compression flow passages 112, allowing flow through the port 120 will more significantly affect the net overall flow during the rebound motion of the rear shock 38 as compared to the compression motion of the rear shock 38. Therefore, adjustments to the adjustment rod 128 will preferably have a greater effect on rebound damping as compared to compression damping of the rear shock 38.

As such, the adjustment rod 128 provides the user of the rear shock 38 with the ability to adjust the rebound damping of the rear shock 38. An adjustment knob 134, which is attached to the end of the rebound adjustment rod 128, allows a user to adjust the adjustment rod 128 and, hence, the rebound damping rate of the rear shock 38. The adjustment knob 134 is located on the outside of the rear shock 38. Thus, it is easily and externally accessible by the user to allow for damping adjustments without requiring disassembly of the rear shock 38. A ball detent mechanism 136 provides a plurality of distinct adjustment positions of the adjustment knob 134. It is noted that the tip 130 of the adjustment rod 128 may or may not completely prevent flow through the port 120 in the fully closed, or downward-most, position. That is, a fluid-tight seal may not be created between the tip 130 of the adjustment rod 128 and the valve seat 132 even in the fully closed position. Thus, some fluid may flow through the port 120 in its "closed" position. Such fluid flow is often referred to as "bleed flow" and, preferably, is limited to a relatively small flow rate. Some amount of bleed flow may be intentionally permitted, or may result from normal manufacturing variations in the sizes or shapes of the tip 130 and valve seat 132. A seal member, such as an O-ring 138, inhibits or prevents fluid from moving beyond the tip 130 portion of the adjustment rod 128 and into an upper portion of the central passage 116.

As described above, the rear shock 38 also includes a reservoir body portion 44 that is coupled to the main body portion 40. The interior chamber of the reservoir body portion 44 communicates with the compression chamber 104 through a passage 140a that extends through the closed end portion 60 of the damper tube 48 of the main body portion 40. This permits hydraulic fluid to move between the reservoir body portion 44 and the compression chamber 104. In a rear shock 38 such as that illustrated herein, in which the piston rod 78 occupies a varying volume of the interior of the damper tube 48 as the shock 38 compresses and extends, damping fluid moves from the main body portion 40 to the reservoir body portion 44 to accommodate the increasing volume of the piston rod 78 within the damper tube 48 during compression and moves from the reservoir body portion 44 to the main body portion 40 to replace the increased volume within the damper tube 48 caused by the evacuation of the piston rod 78 from the damper tube 48 during rebound. Thus, the reservoir body portion 44 acts as a reservoir, or accumulator, for the damping fluid within the rear shock 38.

With reference to FIGS. 2 and 8-14, the reservoir body portion 44 includes a reservoir tube 142. The reservoir tube 142 is closed on both ends thereof. A partition, such as a floating reservoir piston 144, is positioned inside of the reservoir tube 142 and divides the interior space of the reservoir tube 142 is divided into a reservoir chamber 146 and a gas chamber 148. In the illustrated arrangement, the floating reservoir piston 144 is in sealed, sliding engagement with an inside surface of the reservoir tube 142. A substantially fluid-tight seal between the interior surface of the reservoir tube 142 and the reservoir piston 144 is provided by a seal member 150. Although other suitable seals may also be used, the seal member 150 is preferably a substantially round cross-section, annular seal. Although a floating piston 144 is presently preferred due to the relatively simple construction and reliable performance, other types of partitions may be used, such as a bladder arrangement, for example. In addition, a compressible member, such as a closed-cell foam member, may be positioned in the reservoir tube 142 and configured to collapse to enlarge the size of the reservoir chamber 146 and to expand to reduce the size of the reservoir to accept damping fluid from the main body 40 and return (or encourage the return of) damping fluid to the main body 40, respectively.

An end cap 152 closes the reservoir chamber 146 portion of the reservoir tube 142. In the illustrated arrangement, the end cap 152 is located at an upper end of the reservoir tube 142. As discussed above, the tube assembly 46 is attached to the end cap 152 and allows the reservoir body portion 44 to interface with the closed end portion 60 of the damper tube 48 so that hydraulic fluid can flow from the passage 140 in the closed end portion 60 of the damper tube 48 to the reservoir chamber 146 of the reservoir body portion 44. In particular, preferably, the end cap 152 defines a fluid passage 153 that permits fluid to be transferred between the tube assembly 46 and the interior of the reservoir tube 142.

A second end cap 154 closes the gas chamber 148 end of the reservoir tube 142, which in the illustrated arrangement is lower end of the reservoir tube 142 (both in FIG. 8 and as assembled to the bicycle 20). The cap 154 includes a valve assembly 156 to add or remove gas, such as nitrogen, for example, to or from the gas chamber 148. The positive pressure exerted on the floating reservoir piston 144 by the pressurized gas within the gas chamber 148 causes the floating reservoir piston 144 to exert a pressure on the hydraulic fluid in the reservoir chamber 146. With such an arrangement, the positive pressure causes the gas chamber 148 to expand to include any space made available when hydraulic fluid flows from the reservoir chamber into the compression chamber. It also improves the flow of fluid from the reservoir body portion 44 into the compression chamber 104 during the rebound motion of the rear shock 38.

A pressure-activated valve assembly and an inertia-activated (or acceleration-activated) valve assembly are positioned within the reservoir body portion 44. The inertia valve assembly 160 includes an inertia mass 162 slidably supported by a reservoir shaft 164. The inertia mass 162 is lightly biased to a closed position by a biasing member, such as a spring 166. In the illustrated arrangement, the closed position is upward relative to an open position of the inertia mass 162. When in the open configuration, the inertia valve assembly 160 permits communication between the reservoir chamber 146 and the compression chamber 104. Stated another way, when the inertia valve assembly 160 is in the open configuration, hydraulic fluid is permitted to flow from the compression chamber 104 through the passage 140 and an internal passage 168 of the reservoir shaft 164, and out through reservoir shaft fluid ports 170 into the reservoir chamber 146.

Preferably, the pressure-activated valve assembly includes a primary valve assembly 172 and a two-way or bleed valve assembly 174. The primary valve assembly 172 is positioned above the inertia valve assembly 160, or upstream of the inertia valve assembly 160 relative to a compression fluid flow direction within the reservoir body portion 44. The primary valve assembly 172 includes a piston or partition 180 that is fixed within the reservoir tube 142 and defines a partition between the reservoir chamber 146 and an upper portion of the interior of the reservoir tube 142 that communicates with the compression chamber 104 (referred to herein as the primary valve chamber 182). In the illustrated arrangement, the partition 180 is carried by the end cap 152 and, preferably, includes external threads that engage with internal threads of the end cap 152. The partition includes a centrally-located opening, which supports the reservoir shaft 164. In the illustrated arrangement, the opening includes internal threads that mate with external threads of the reservoir shaft 164. A shoulder portion 184 is defined where the reservoir shaft 164 reduces in diameter. The shoulder 184 supports an annular washer 186. The annular washer 186 supports a compression flow shim stack 188 of the primary valve assembly 172 against a lower face of the piston 180. The washer 186 also defines an upper stop for the inertia mass 162 to define a closed position of the inertia mass 162.

As illustrated, the partition 180 has one or more axial compression flow passages 190 and one or more axial refill ports 192. The compression flow shim stack 188 regulates the flow rate of hydraulic fluid through the compression flow passages 190. In one embodiment, between 50 lbs and 75 lbs of force is required to be exerted on the compression flow shim stack 188 in order to deflect the compression flow shim stack 188 enough to allow the hydraulic fluid to flow through the compression flow passages 190 at a rate that allows the piston 54 to move within the damper tube 48 at a rate of approximately 0.05 m/s. In another embodiment, between 25 lbs and 50 lbs of force is required to be exerted on the compression flow shim stack 188 in order to allow the piston 54 to move within the damper tube 48 at a rate of approximately 0.05 m/s.

In certain embodiments, when there is at least about 25 lbs, 35 lbs, 45 lbs, 55 lbs, 65 lbs or 75 lbs of force exerted on the compression flow shim stack 188, the shim stack 188 deflects thereby opening the damping valve. Specifically, the compression flow shim stack 188 deflects enough to allow the piston 54 to move within the damper tube 48 at a rate of approximately 0.05 meters/sec.

However, to regulate the flow rate of hydraulic fluid through the compression flow passages 190, a flow element having a series of ports may be substituted for the shim stack 188. In general, any of the shim stacks described herein may be replaced or augmented with a flow element having a series of ports for the purpose of regulating the flow rate of hydraulic fluid through the various components comprising the rear shock 38. In addition, other suitable arrangements may also be used. For example, a check plate (with or without a biasing member), an elastomer member, or other suitable methods for controlling damping fluid flow through a passage may also be used.

The axial compression flow passages 190 may cumulatively perforate and, hence, allow the passage of hydraulic fluid through, 10% to 50%, or 25% to 35%, of the working surface area of the partition 180, which may be defined as the area bounded by a peripheral edge of the partition 180. In the illustrated arrangement, the working area substantially corresponds to a cross-sectional area of the interior space of the reservoir tube 142. The axial refill ports 192 may cumulatively perforate and, hence, allow the passage of hydraulic fluid through, 10% to 50% or more of the working surface area of the partition 180. The axial refill ports 192 may cumulatively perforate and allow the passage of hydraulic fluid through 2% to 25% of the working surface area of the partition 180. The axial refill ports 192 may cumulatively perforate and allow the passage of hydraulic fluid through the partition 180 at a flow rate approximately equal to the amount of flow of hydraulic fluid that is flowing through passage 140, i.e., approximately equal to the amount of flow of hydraulic fluid that is flowing from the reservoir body portion 44 to the main body portion 40.

In one embodiment, the compression flow shim stack 188 is configured to deflect to allow, but damp the flow rate of, hydraulic fluid through the compression flow passages 190 at normal operating pressures of the rear shock 38. In certain embodiments, each of the shims comprising the compression flow shim stack 188 is preferably a bendable disc made from a metallic alloy. In one embodiment, five shims that are approximately 16 mm in diameter and 0.15 mm thick, stacked together, would produce a compression damping force of approximately 75-80 lbs at a rate of fluid flow that allows the piston 54 to move within the damper tube 48 at a rate of approximately 0.05 m/s. In another embodiment, four shims that are approximately 16 mm in diameter and 0.15 mm thick, stacked together, would produce a compression damping force of approximately 65-70 lbs at a rate of fluid flow that allows the piston 54 to move within the damper tube 48 at a rate of approximately 0.05 m/s. In another embodiment, three shims that are approximately 16 mm in diameter and 0.15 mm thick, stacked together, would produce a compression damping force of approximately 55-60 lbs at a rate of fluid flow that allows the piston 54 to move within the damper tube 48 at a rate of approximately 0.05 m/s. In another embodiment, two shims that are approximately 16 mm in diameter and 0.15 mm thick, stacked together, would produce a compression damping force of approximately 45-50 lbs at a rate of fluid flow that allows the piston 54 to move within the damper tube 48 at a rate of approximately 0.05 m/s, and so on. In another embodiment, three shims having approximately a 21 mm OD, an 8 mm ID and a 0.24 mm thickness are positioned on an approximately 0.7 mm dished piston and pinched on an approximately 12 mm OD pivot shim generating approximately 250-300 pounds of force at shaft speeds between approximately 1 in/s and 10 in/s. Shim stack configurations that include a lesser or greater number of shims and that produce less damping force or greater damping force than recited above may also be used.

The compression flow shim stack 188 of the present invention operates to damp the compression motion of the rear shock 38 and, accordingly, can be configured to deflect to allow hydraulic fluid to flow through the compression flow passages 190 at low or regular operating pressures within the primary valve chamber 182. In one embodiment, approximately 90% or more of the compression motion damping of the rear shock is accomplished by the compression flow shim stack 188 located in the reservoir body portion 44, whereas the remainder of the compression motion damping of the rear shock is accomplished by other components of the rear shock (e.g., the compression shim stack 114 located in the main body portion 40). In another embodiment, approximately 80% or more of the compression motion damping of the rear shock is accomplished by the compression flow shim stack 188 located in the reservoir body portion 44. In yet another embodiment, approximately 70% or more of the compression motion damping of the rear shock is accomplished by the compression flow shim stack 188 located in the reservoir body portion 44. In yet another embodiment, approximately 50% or more of the compression motion damping of the rear shock is accomplished by the compression flow shim stack 188 located in the reservoir body portion 44.

As described above, the pressure-activated valve assembly also includes a two-way valve, or bleed valve 174, which selectively permits fluid flow between the primary valve chamber 182 and the reservoir chamber 146 in both the compression and rebound directions. The bleed valve 174 may be referred to as a pressure-activated valve (as opposed to an acceleration-activated valve, for example) because the valve 174 is responsive to pressure differentials between the primary valve chamber 182 and the reservoir chamber 146. In the illustrated arrangement, the bleed valve 174 is a needle-and-orifice-type valve. In particular, preferably, an adjustment rod 194 extends downwardly from the end cap 152. An upper end of the adjustment rod 194 includes external threads that mate with interior threads of a central opening of the end cap 152. The reservoir adjustment rod 194 preferably is in rotational communication with an adjustment rod driver 196, which is supported for relative rotation by the end cap 152. An adjustment knob 198 is coupled for rotation with the driver 196. The adjustment knob 134 is located externally of the reservoir tube 142 such that a user can access the adjustment knob 134 without disassembly of the shock 38. The adjustment rod 194 and the driver 196 are configured such that rotational motion is transmitted therebetween, but such that translational motion is permitted, such as by a splined connection, for example. Thus, rotation of the driver 196 (via rotation of the knob 134) causes rotation of the adjustment rod 194. As a result of the threaded engagement between the adjustment rod 194 and the end cap 152, rotation of the adjustment rod 194 results in simultaneous translation, or axial movement, of the adjustment rod 194 relative to the end cap 152, which allows the fluid flow through the bleed valve 174 to be adjusted, as described below. A ball detent mechanism 136 located between the knob 134 and end cap 152 provides distinct adjustment positions of the adjustment knob 134.

Further, the adjustment rod 194 includes a tip portion 194a that preferably adjustably regulates the flow of hydraulic fluid through a metering rod flow port 202 located within the reservoir shaft 164. The tip 194a preferably defines a tapered surface that tapers to a smaller cross-sectional diameter toward the bottom end of the tip 194a (i.e., the end closest to the port 202). The largest diameter of the conical portion preferably is greater than the diameter of the cylindrical metering rod flow port 202, and the smallest diameter of the conical portion preferably is smaller than the diameter of the cylindrical metering rod flow port 202. With such an arrangement, the flow of hydraulic oil through the metering rod flow port 202 can be reduced by advancing the tip 194a of the adjustment rod 194 into the metering rod flow port 202. In some arrangements, the flow of hydraulic oil through the metering rod flow port 202 can be substantially prevented by fully engaging the tip 194a of the bleed valve plug 182 with the metering rod flow port 202. However, some amount of flow may occur through a clearance space between the tip 194a and the metering rod flow port 202, which may occur by design or due to normal manufacturing variations in the size or shape of the tip 194a and the port 202, possibly among other components.

Advantageously, the overall structure of the illustrated reservoir body portion 44 facilitates the provision of damping adjustment features in shock absorber 38 that can be manufactured in a cost-effective manner. For example, preferably, the partition 180 is provided on the same end portion of the reservoir tube 142 in which the damping fluid is delivered from the main body portion 40 (via the passage 153). Thus, externally-accessible adjustment features (e.g., the adjustment rod 194 and associated components) may be incorporated without adding unnecessary complexity. For example, in the illustrated arrangement, because the adjustment rod 194 extends from the same end of the reservoir body portion 44 from which the damping fluid is delivered to the reservoir body portion 44, the damping fluid is easily accessible and the adjustment rod does not need to be excessively long. In particular, it is advantageous that the adjustment rod 194 enters the reservoir body portion 44 on the reservoir chamber 146 side of the floating piston 144 and, thus, does not need to extend through the floating piston 144. In an arrangement in which an adjustment rod needs to pass through the floating piston, it is necessary to provide a seal between the adjustment rod and floating piston, which increases the frictional drag on the floating piston. Moreover, the dimensional tolerances (especially concentricity dimensions) must be tightly controlled to allow assembly and smooth operation of the components over a reasonable lifespan. Such tightly controlled tolerances increase the cost of manufacturing the shock absorber. In addition to the adjustment rod 194, which permits adjustment of the bleed valve 174, the primary valve 172 and/or inertia valve 160 are conveniently accessible from the end of the reservoir body portion 44 into which the damping fluid is delivered from the main body portion 40 such that additional externally-accessible adjustment mechanisms could be provided, such as by being incorporated into the end cap 152, for example.

As described above, the partition 180 also includes refill ports 192, which permit rebound fluid flow through the partition 180. A rebound flow shim stack 204 covers the refill ports 192 on an upper face of the partition 180. In the illustrated embodiment, the rebound flow shim stack 204 is comprised of a single shim that preferably is biased to a closed position by a biasing mechanism, such as a spring. Thus, as used herein, a "shim stack" may include one shim or multiple shims. In the illustrated embodiment, the biasing mechanism is at least one and preferably multiple wave washers 206 positioned between the shim 204 and the end cap 152. Preferably, the wave washers 206 lightly bias the shim 204 to the closed position, but permit the shim 204 to open in response to a relatively small opening force. In the illustrated arrangement, four wave washers 206 are provided, with a single flat washer 208 interposed between the wave washers 206 and the shim 204. Thus, the rebound flow shim 204 substantially prevents fluid from flowing from the primary valve chamber 182 to the reservoir chamber 146 through refill ports 192, while not significantly inhibiting fluid flow from the reservoir chamber 146 into the primary valve chamber 182 through the refill ports 192. Although preferred, the rebound flow shim stack 204 is not limited to the illustrated arrangement. The rebound flow shim stack 204 can be comprised of multiple shims, similar to the compression flow shim stack 188 described above.

In the illustrated embodiment, the damping control of the rebound motion of the rear shock 38 is advantageously at least primarily located in the main shock body of the rear shock 38, as opposed to being located in the reservoir body portion 44. Because the rebound flow restriction, or rebound damping, is primarily located in the main shock body of the rear shock 38, the flow of hydraulic fluid into the compression chamber 104 is not disturbed by cavitation or other flow disrupting effects that can result when the hydraulic fluid is sucked or pulled through the flow restriction devices or shim stacks that are located in the reservoirs of other, conventional designs. In the illustrated embodiment, during the rebound motion of the rear shock, a compressive force pushes the hydraulic fluid located in the rebound chamber 106 through the rebound flow passages 122, thus avoiding cavitation and other flow efficiency effects that may otherwise result. Another benefit of having the compression damping primarily occur in the reservoir body portion 44 and the rebound damping primarily occur in the main body portion 40 is that the heat generated by each is transferred to separate portions of the damping fluid within the overall system.

In certain embodiments, at least 90%, at least 80%, at least 70%, at least 60% or at least 50% of the rebound motion damping of the rear shock 38 is accomplished in the main body portion 40, whereas the remainder of the rebound damping of the rear shock is accomplished by other components of the rear shock (preferably in the reservoir body portion 44). In one embodiment, this rebound damping in the main body portion 40 can be substantially accomplished by the rebound shim stack 124 located in the main body portion 40.

Figure 12:
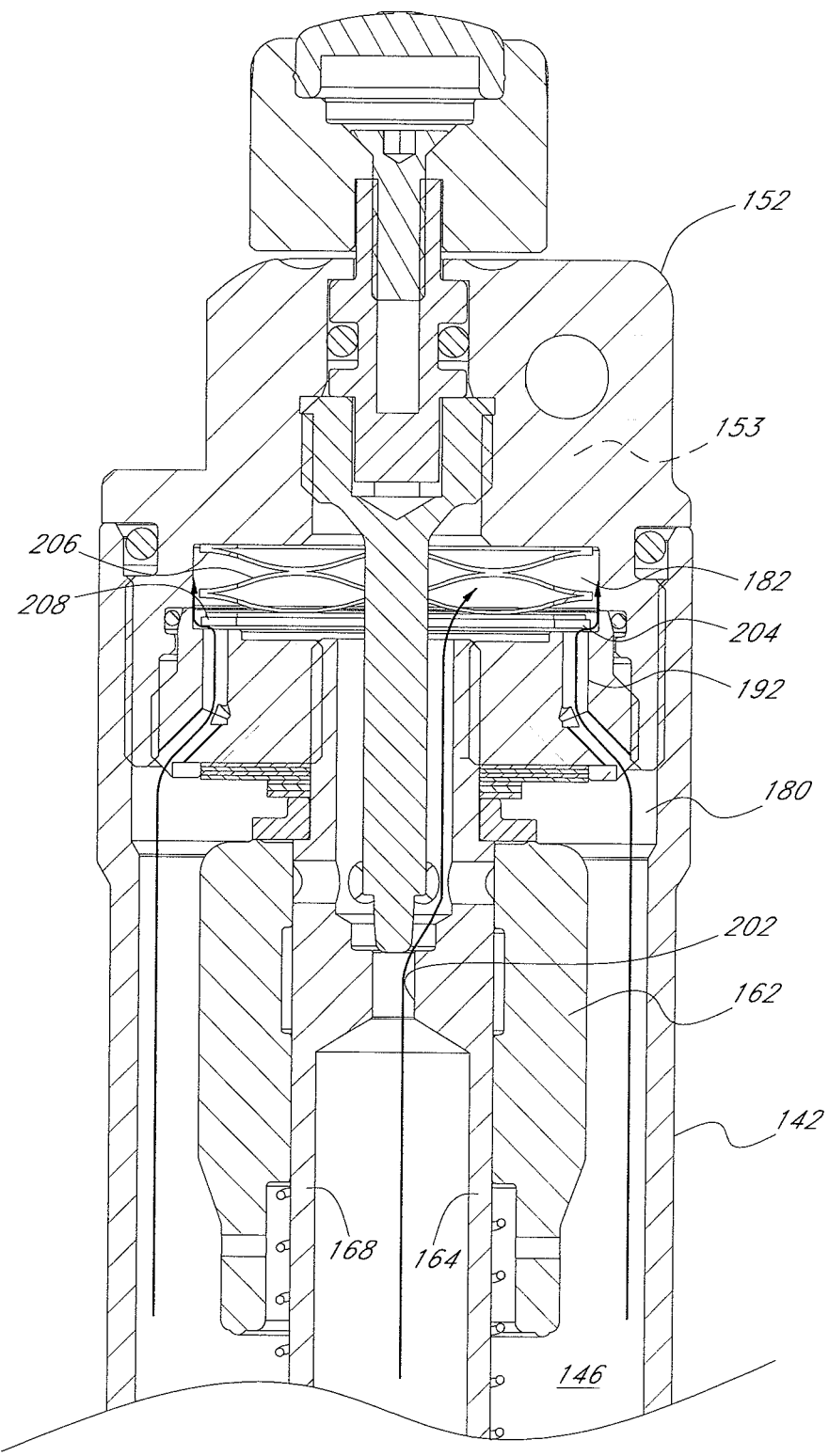
FIG. 12 is an enlarged cross-section of the reservoir of FIG. 8 showing the flow path of hydraulic fluid through the primary valve during the rebound motion of the rear shock, the inertia valve being in a closed position.

FIG. 12 illustrates the flow of hydraulic fluid from the reservoir chamber 146, through the rebound flow passages 192 and port 202, as well as the corresponding preferred deflection of the rebound flow shim stack 204, when the inertia valve 160 is in the closed position. As shown, preferably, the rebound flow travels along a side of the inertia mass 162 along an axis of motion and in a closing direction of the inertia mass 162. Thus, advantageously, the rebound fluid flow can exert a fluid force on the inertia mass 162 tending to close it more quickly when the shock 38 changes from compression motion to rebound motion.

Figure 13:
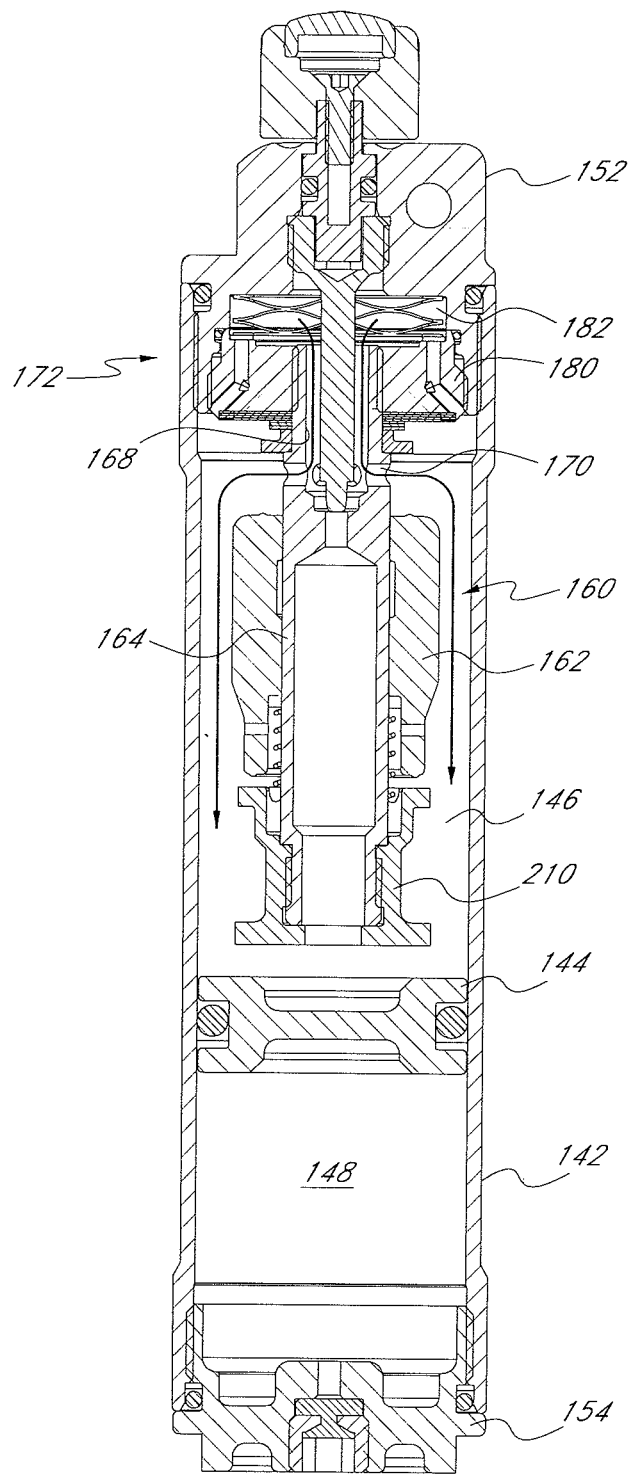
FIG. 13 is a cross-section of the reservoir of FIG. 8 showing the inertia valve in an open position.
Figure 14:
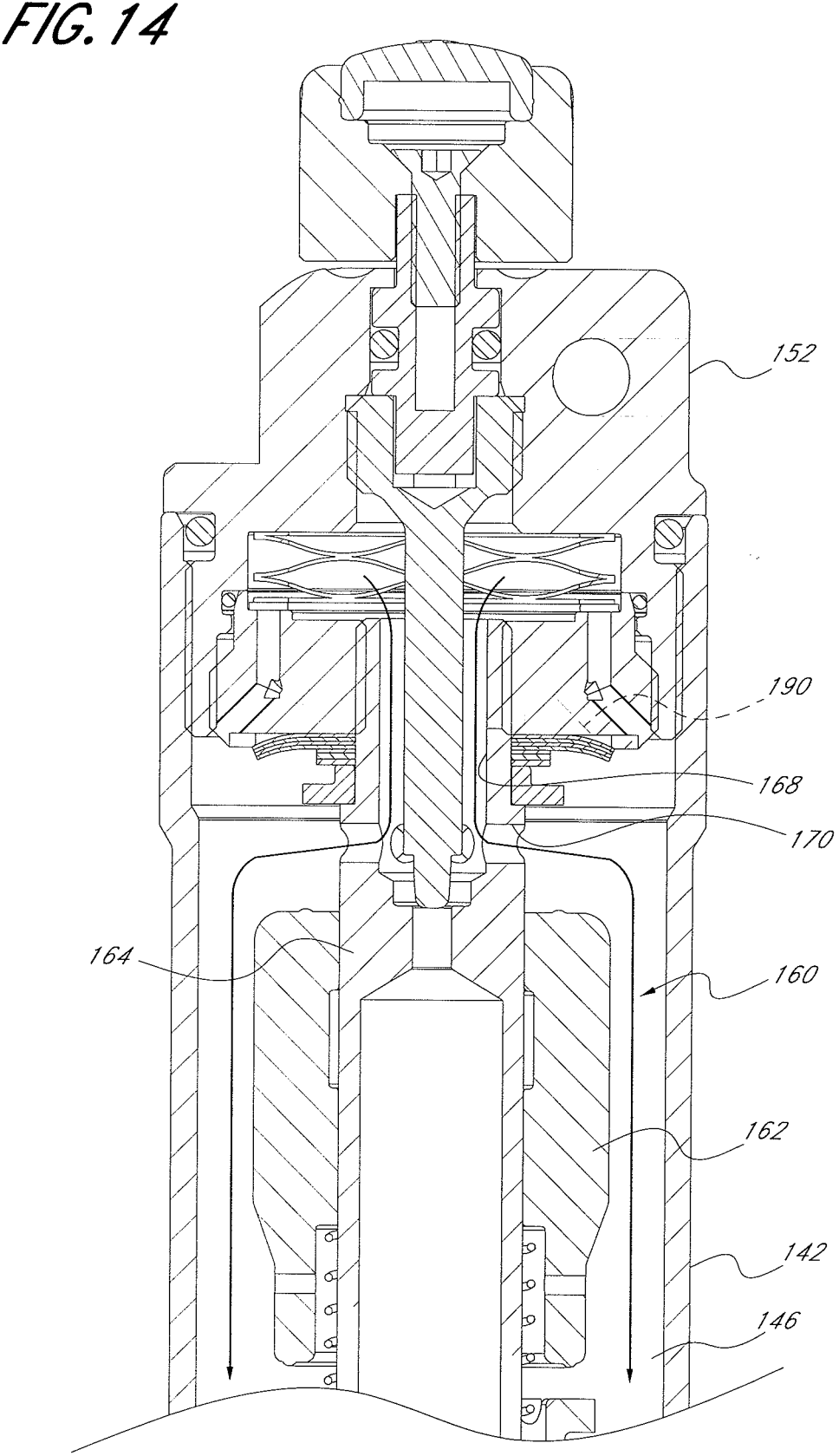
FIG. 14 is an enlarged cross-section of the reservoir of FIG. 8 showing the flow path of hydraulic fluid through the inertia valve during the compression motion of the rear shock, the inertia valve accordingly being in an open position.

As described previously, the inertia valve assembly 160 is positioned within the reservoir tube 142 and includes the inertia mass 162 slidably supported on the reservoir shaft 164. As illustrated in FIGS. 13 and 14, the plurality of radially extending reservoir shaft fluid ports 170, each preferably having a generally cylindrical geometry, extend radially through the reservoir shaft 164. The reservoir shaft fluid ports 170 connect the passage 168 to the reservoir chamber 146. The inertia mass 162 is normally biased to an upward position by a biasing mechanism, such as the spring 166, to normally close the ports 170. The spring 166 is supported by a stop 210 that is secured to a lower end of the reservoir shaft 164, such as by a threaded connection or other suitable arrangement. In response to a suitable acceleration force, the inertia mass 162 slides in a downward direction relative to the reservoir shaft 164 to open the ports 170, as is discussed in greater detail below.

The diameter of each reservoir shaft fluid port 170 may be between 0.5 mm and 5.0 mm. As illustrated, the reservoir shaft 164 preferably has a total of six equally spaced reservoir shaft fluid ports 170, each with a diameter equal to approximately 1.0 mm. In another embodiment, the diameter of each reservoir shaft fluid port 170 is approximately 1.5 mm or more. In another embodiment, the diameter of each reservoir shaft fluid port 170 is approximately 2.0 mm or more. In another embodiment, the diameter of each reservoir shaft fluid port 170 is approximately 3.0 mm or more. In yet another embodiment, the diameter of each reservoir shaft fluid port 170 is approximately 4.0 mm or more. In another embodiment, the diameter of each reservoir shaft fluid port 170 is approximately 5.0 mm or more. In another embodiment, the reservoir shaft 164 may have two, four or more reservoir shaft fluid ports 170, regardless of the diameter of the reservoir shaft fluid ports 170. In certain embodiments, the total cross-sectional area of the reservoir shaft fluid ports 170 is 2 square millimeters to 100 square millimeters, 2 square millimeters to 80 square millimeters, 2 square millimeters to 60 square millimeters, 2 square millimeters to 40 square millimeters, 2 square millimeters to 20 square millimeters, 2 square millimeters to 10 square millimeters, or 2 square millimeters to 5 square millimeters. In certain embodiments, the total cross-sectional area of the reservoir shaft fluid ports 170 is no more than 12 square millimeters, no more than 10 square millimeters, no more than 8 square millimeters, no more than 6 square millimeters, or no more than 5 square millimeters.

Furthermore, in one embodiment, when an upward acceleration force is applied to the reservoir body portion 44 of the rear shock 38 (such as when the bicycle 20 encounters a bump) that causes the inertia valve 160 to open and causes the piston 54 to move within the damper tube 48 at a rate of approximately 1.0 m/s, the components comprising the inertia valve 160 will preferably be configured such that virtually all of the hydraulic fluid flows into the reservoir chamber 146 via the reservoir shaft fluid ports 170 and, accordingly, such that only a small volume of hydraulic fluid, if any, flows through the compression flow passages 190 at that rate of piston 54 movement. However, the inertia valve 160 of that same embodiment will preferably be configured such that, when the rear shock 38 encounters a more severe bump that causes the piston 54 to move within the damper tube 48 at a rate of approximately 4.0 m/s, the components comprising the inertia valve 160 will preferably be configured such that approximately 20% or more of the total flow of hydraulic fluid flowing into the reservoir chamber 146 will flow through the reservoir shaft fluid ports 170 and approximately 80% or less of the total flow of hydraulic fluid flowing into the reservoir chamber 146 will flow through the compression flow passages 190.

In certain embodiments, when the rear shock 38 encounters a more severe bump that causes the piston 54 to move at a rate of approximately 4.0 m/s, the components comprising the inertia valve 160 will preferably be configured such that at least 80%, at least 70%, at least 60%, at least 50%, at least 40%, or at least 35% of the total flow of hydraulic fluid flowing into the reservoir chamber 146 will flow through passages other than passages closable by the inertia mass 162 (e.g., in the illustrated embodiment, the compression flow passages 190 and the bleed valve port 202).

In certain embodiments, the inertia valve 160 will preferably be configured such that, when the rear shock 38 encounters a more severe bump that causes the piston 54 to move at a rate of approximately 4.0 m/s, the components comprising the inertia valve 160 will preferably be configured such that no more than 10%, no more than 20%, no more than 30%, no more than 40%, no more than 50% or no more than 60% of the total flow of hydraulic fluid flowing into the reservoir chamber 146 will flow through the passages closable by the inertia mass (e.g., in the illustrated embodiment, the reservoir shaft fluid ports 170).

The inertia mass 162 preferably is made from a relatively dense material, for example a dense metal such as brass, and preferably has a mass less than approximately two ounces. In another embodiment, the inertia mass 162 preferably has a mass less than approximately one and one-half ounces. In another embodiment, the inertia mass 162 has a weight of approximately 32 grams, or 1.13 ounces. In another embodiment, the inertia mass 162 preferably has a mass less than approximately one ounce. In yet another embodiment, the inertia mass 162 preferably has a mass less than or equal to approximately one-half ounce. The inertia mass 162 preferably is relatively free of any axial passages or other sophisticated internal features or contours other than the main, cylindrical passage through the longitudinal center of the inertia mass 162, and also the annular groove 212 on the inside surface of the inertia mass 162. Without such passages and sophisticated internal features and contours, the inertia mass 162 is advantageously easier to manufacture, does not require substantial deburring on the internal surfaces, and is less likely to bind or stick to the reservoir shaft 164 as compared to other, conventional designs. The annular groove 212 is preferably formed on the inside surface of the inertia mass 162 to limit the amount of surface area on the inside surface of the inertia mass 162 that may come into contact with the outer surface of the reservoir shaft 164 and, hence, limit the amount of drag between the two components. Preferably, the inertia mass 162 has a streamlined geometric configuration such that the mass to fluid resistance ratio is increased. In addition, the lower end of the inertia mass 162 includes a recess 214 that accommodates an upper end of the biasing spring 166 and defines a spring seat that is contacted by one end of the biasing spring 166. In the illustrated arrangement, the inertia mass 162 includes one or more, and preferably a pair, of axial ports 216 that pass radially through the inertia mass 162 and open into the recess 214. The ports 216 may assist in evacuating fluid from between the inertia mass 162 and the stop 210 as the inertia mass 162 moves downward such that movement of the stop 210 is not inhibited. In some embodiments, the inertia mass 162 may also have an annular groove (not shown) around the exterior of the inertia mass 162.

Figure 11:
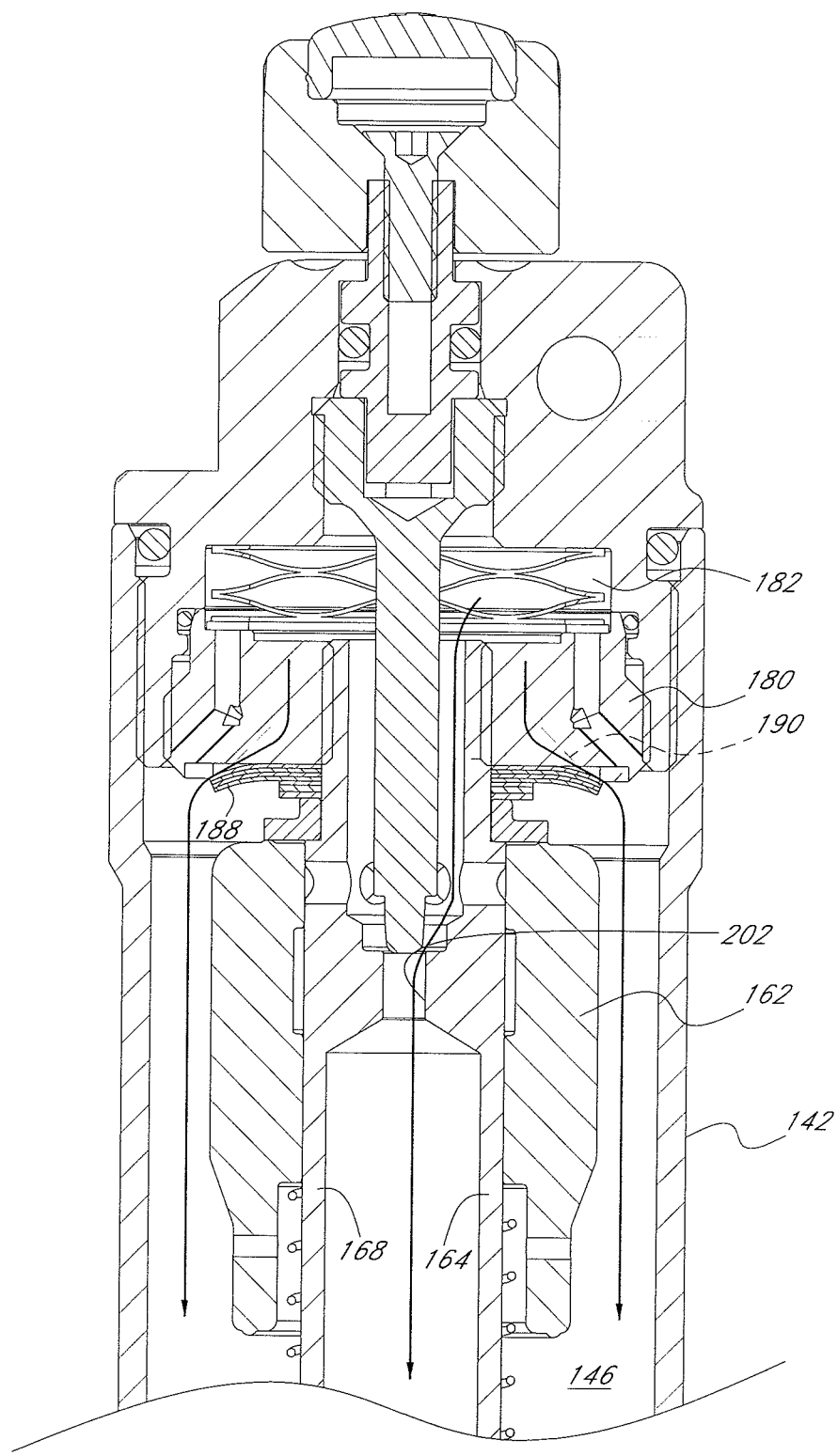
FIG. 11 is an enlarged cross-section of the reservoir of FIG. 8 showing the flow path of hydraulic fluid through the primary valve during the compression motion of the rear shock, the inertia valve being in a closed position.

As discussed previously, the spring 166 biases the inertia mass 162 into an upward, or closed, position wherein the inertia mass 162 covers the openings of the reservoir shaft fluid ports 170 to substantially prevent fluid flow from the passage 168 to the reservoir chamber 146. Preferably, when the inertia mass 162 is in a closed (upward) position, flow to the reservoir chamber 146 primarily occurs through the compression flow passages 190 in the partition 180. FIG. 11 illustrates the flow of hydraulic fluid from the passage 168 through the compression flow passages 190 in the partition 180 and into the reservoir chamber 146, as well as the corresponding preferred deflection of the compression flow shim stack 188, when the inertia valve 160 is in the closed position. However, the flow path, but not necessarily the flow volume, of hydraulic fluid through the compression flow passages 190 in the partition 180 and into the reservoir chamber 146 may be as illustrated in FIG. 11 even if the inertia valve 160 were in an open position.

As discussed, the inertia mass 162 is also movable into a downward, or open, position against the biasing force of the spring 166. In the open position, which is illustrated in FIGS. 13 and 14, the inertia mass 162 uncovers at least a portion of the reservoir shaft fluid ports 170 to allow fluid to flow therethrough, and a reduced compression damping rate is achieved. The stop 210 preferably operates as the lowermost stop surface for the inertia mass 162. With the illustrated arrangement, preferably, hydraulic fluid flows from the passage 168 through the reservoir shaft fluid ports 170, and around and along the inertia mass 162 into the reservoir chamber 146. Note that, while the inertia mass 162 is in the open position, hydraulic fluid may still flow from the passage 168 through the compression flow passages 190 in the partition 180 and into the reservoir chamber 146, as illustrated in FIG. 11, in addition to flowing through inertia valve.

It is noted that, while the inertia mass 162 may be described as having an open and a closed position, the inertia mass 162 likely does not completely prevent flow through the reservoir shaft fluid ports 170 in the closed position. That is, a fluid-tight seal is not typically created between the inertia mass 162 and the reservoir shaft 164 on which it slides. Thus, some fluid may flow through the inertia valve 160 in its closed position. Such fluid flow is often referred to as "bleed flow" and, preferably, is limited to a relatively small flow rate. To create a fluid-tight seal between the inertia mass 162 and the reservoir shaft 164 would require precise dimensional tolerances, which would be expensive to manufacture, and may also inhibit movement of the inertia mass 162 on the reservoir shaft 164 in response to relatively small acceleration forces.

With reference to FIGS. 9-12, another advantageous feature of the illustrated inertia valve 160 is a circumferential groove 218 around the exterior of the reservoir shaft 164. The center plane of the groove 218 preferably aligns with the axial centerlines of each of the reservoir shaft fluid ports 170. The groove 218 functions as a flow accumulator, equalizing the pressure of the hydraulic fluid emanating from the reservoir shaft fluid ports 170.

The groove 218 preferably may comprise an upper chamfer portion, an arcuate portion, and a lower chamfer portion. The width of the groove 218 (i.e., the combined width of the upper chamfer portion, the arcuate portion, and the lower chamfer portion) is preferably greater than the diameter of each of the reservoir shaft fluid ports 170 such the groove 218 extends both above and below each of the reservoir shaft fluid ports 170 and such that a significant amount of fluid can accumulate in the groove 218. In another embodiment, the groove 218 could be smaller than the diameter of the ports 170. The groove 218 allows the fluid pressure to be distributed evenly over the inner circumference of the inertia mass 162. The even distribution of fluid pressure preferably creates a force tending to center the inertia mass 162 around the reservoir shaft 164, thus partially or fully compensating for any inconsistencies in fluid pressure that would otherwise occur due to the locations or orientations of, or variations in size between, the individual reservoir shaft fluid ports 170. Such a feature helps to prevent binding of the inertia mass 162 on the reservoir shaft 164. The prevention of binding of the inertia mass 162 on the reservoir shaft 164 is beneficial in a bicycle application because it is desirable that the inertia valve be very sensitive to any terrain features which may only transmit relatively small acceleration forces to the inertia valve 160.

The preferred configuration of the groove 218 provides a nearly uniform (i.e., simultaneous) cutoff of hydraulic fluid flow emanating from each of the reservoir shaft fluid ports 170 as the inertia mass 162 reverts to its closed position. This is beneficial to ensuring that the inertia mass is not pushed off-center by the reservoir shaft fluid ports 170. As discussed, the preferred configuration of the groove 218 also advantageously ensures that the inertia mass 162 is not pushed off-center by a non-uniform flow of hydraulic fluid through the reservoir shaft fluid ports 170, or by non-uniform forces exerted by the hydraulic fluid flowing through the reservoir shaft fluid ports 170, during the compression motion of the rear shock 38.

Additionally, the chamfers may advantageously provide for a progressive shut off of hydraulic fluid flow through the reservoir shaft fluid ports 170 as the inertia mass 162 reverts to its closed position. In particular, as the acceleration causing the inertia mass 162 to move downward relative to the reservoir shaft fluid ports 170 is reduced, causing the inertia mass 162 to move upward, the inertia mass 162 first blocks the flow of hydraulic fluid flowing away from the lower chamfer portion, thus blocking only a portion of the hydraulic fluid flow going through the reservoir shaft fluid ports 170 in this position. The hydraulic fluid flowing from the lowest portion of the lower chamfer portion is less than the hydraulic fluid flowing from the upper portion of the lower chamfer portion. Thus, as the hydraulic mass 162 continues to move upward, it progressively blocks a greater amount of the hydraulic fluid flowing away from the lower chamfer portion. As the hydraulic mass 162 continues to move upward, it progressively blocks a greater portion of the arcuate portion and, finally, the upper chamfer portion, until substantially all of the hydraulic fluid flowing through the reservoir shaft fluid ports 170 is stopped.

Although the illustrated reservoir body portion 44 includes an inertia valve 160, in other arrangements, the inertia valve 160 may be omitted or may be replaced with, or supplemented with, other compression or rebound fluid flow valves. However, the inertia valve 160 is preferred because it operates to distinguish terrain-induced forces from rider-induced forces. Terrain-induced forces are generally upwardly directed (compression) forces caused by the vehicle (such as a bicycle) encountering a bump. Rider-induced forces, in the case of a bicycle application, typically are short duration, relatively large amplitude forces generated from the pedaling action or other aggressive movements of the rider. The inertia valve may alternatively be configured to operate in response to rebound forces, rather than compression forces.

The illustrated embodiment includes multiple features that enhance the performance, durability, longevity adjustability and manufacturability, among other features, aspects and advantages of the shock absorber 38. For example, the direction of fluid flow within the reservoir chamber 146 tends to pass alongside the inertia mass 162 in both compression and rebound motion of the shock absorber 38. In addition, the flow tends to be generally aligned with the axis of movement of the inertia mass 162. Thus, advantageously, the flow of fluid within the reservoir chamber 146 tends to assist in opening the inertia mass 162 during compression and assist in closing the inertia mass 162 during rebound. Accordingly, in addition to the features described above, such an arrangement further enhances the sensitivity of the inertia valve 160 in comparison to arrangements in which the flow is isolated from the inertia mass in one or both of compression and rebound movement.

In addition, as discussed above, the compression damping attributes of the shock absorber 38 preferably are primarily influenced by the compression damping valves (e.g., primary valve assembly 172 and bleed valve assembly 174) within the reservoir body portion 44. Accordingly, the larger the volume of damping fluid displaced from the main body portion 40 to the reservoir body portion 44, the greater the possibility for manipulating the flow of damping fluid to create the desired damping effect. For example, a greater volume of damping fluid introduced into the reservoir body portion 44 (or wherever the primary damping valves are located) allows for more separate damping circuits to be utilized and/or allows for more adjustable damping valves to be provided.

Advantageously, the damper components (e.g., damper tube 48 and piston rod 78) of the illustrated main body portion 40 are configured such that the main damper functions substantially as a pump during compression of the shock absorber 38. That is, the damper components of the main body portion 40 are configured to move a large portion of the total available fluid volume of the damper tube 48 from the main body portion 40 to the reservoir body portion 44 during compression. In the illustrated arrangement, such pumping action is achieved primarily by providing a large outside diameter piston rod 78 relative to the inside diameter of the reservoir tube 48. Accordingly, the piston rod 78 tends to displace a significant volume of the total fluid within the damper tube 48 to the reservoir body portion 44 during a complete compression stroke. The particular percentage of the fluid displaced can be calculated for any of the possible combinations of component or shock absorber 38 dimensions or characteristics as described immediately below. For example, a total volume of the damper tube 48, total volume of the piston rod 78 and, thus, the displacement percentage could be calculated or reasonably estimated based on, for example, each of the possible shock lengths, piston rod 78 diameters, reservoir tube 48 diameters, clearances or ratio's, described below. Preferably, at least about 30% of the damping fluid within the damper tube 48 is displaced by the piston rod 78 during a complete compression stroke. In some arrangements, at least about 40, 45, 50, 60, 70 80 or 90% of the damping fluid within the damper tube 48 is displaced by the piston rod 78 during a complete compression stroke. In one presently preferred arrangement, approximately 46% of the damping fluid within the damper tube 48 is displaced by the piston rod 78 during a complete compression stroke. Displacement of a significant percentage of the total fluid within the damper tube 48 could also be accomplished by not allowing any fluid flow through the main body damping piston 54 (i.e., a piston displacement arrangement). However, preferably, as discussed above, fluid flow is permitted through the main body damping piston 54 during compression to be used during subsequent rebound motion of the shock absorber 38. Piston displacement arrangements require some method of filling the rebound chamber, which would be difficult to accomplish in an integrated rear shock absorber arrangement (i.e., both spring and damping functions) while maintaining a reasonable manufacturing cost and weight. In addition, with the illustrated arrangement, the main body portion 40 and reservoir body portion 44 may be described as having a master/slave relationship. For example, during compression motion, the damping action of the shock absorber 38 preferably is primarily controlled by the compression damping circuit(s) within the reservoir body portion 44. Thus, the reservoir body portion 44 is the master to the main body portion 40 slave because the reservoir body portion 44 controls the motion and the main body portion 40 moves as permitted by the damping action within the reservoir body portion 44. On rebound, the roles may be reversed. For example, the rebound damping preferably is controlled primarily by the rebound damping circuit(s) of the main body portion 40, which acts as the master to control rebound fluid flow. The flow within the rebound circuit(s) of the reservoir body portion 44 is controlled by the main body portion 40 rebound damping circuit(s) and, thus, acts as the slave to the rebound damping circuit(s) of the main body portion 40.

In a preferred arrangement, in the context of a bicycle rear shock absorber 38, the piston rod outer diameter is between about 6 mm and about 20 mm and, more preferably, between about 8 mm and about 20 mm. However, the piston rod outer diameter may be about 9 mm, 10 mm, 11 mm, 12 mm, 13 mm, 14 mm, 15 mm 16 mm, 17 mm, 18 mm or 19 mm. In one particularly preferred arrangement, the piston rod outer diameter is about 12 mm. Furthermore, in other arrangements, taking into account other factors or applications, the piston rod outer diameter may be larger or smaller than the above-described dimensions. In a preferred arrangement, the damper tube inner diameter is between about 8.4 mm and about 35 mm. More preferably, the damper tube inner diameter is between about 14 mm and about 21 mm. A presently preferred embodiment of the damper tube inner diameter is about 17.7 mm. However, the damper tube inner diameter may be about 9 mm, 10 mm, 11 mm, 12 mm, 13 mm, 14 mm, 15 mm 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 31 mm, 32 mm, 33 mm or 34 mm, preferably taking into account the outer diameter of the piston rod 78 and providing a desirable amount of clearance between the two to accommodate an appropriate sealing arrangement. Preferably, the minimum diametrical clearance totals at least about 1.5 mm (i.e., about 0.75 mm of radial clearance). In a preferred arrangement, the clearance totals between about 1.5 mm and about 9.5 mm. More preferably, the total clearance is between about 1.5 mm and about 8 mm. However, the total clearance may be about 2 mm, 3 mm, 4 mm, 5 mm, 6 mm, 7 mm, 8 mm or 9 mm, among other possibilities depending on the size, application or other relevant factors of the shock absorber 38.

In a preferred arrangement, a ratio of the damper tube 48 inside diameter to the piston rod 78 outside diameter is between about 1.05:1 and about 1.75:1. In a presently preferred arrangement the ratio is about 1.5:1 and, more specifically, about 1.48:1. However the ratio may be about 1.05:1, 1.1:1, 1.2:1, 1.3:1, 1.4:1, 1.5:1, 1.6:1, 1.7:1, or 1.75:1. With a shock absorber 38 having a piston rod outer diameter and damper tube inner diameter sized substantially within the ranges described above (preferably, a piston rod outer diameter between about 6-20 mm and a damper tube inner diameter of about 8-35 mm and, more specifically, with a piston rod outer diameter of about 12 mm and a damper tube inner diameter of about 17.7 mm and/or within about any combination of the length, travel and leverage ratio ranges discussed below), the ratio of the damper tube 48 inside diameter to the piston rod 78 outside diameter may be as much as about 2.0:1 or about 2.5:1.

A preferred shock absorber 38 has a length (usually measured between the centers of the eyelets 62 and 66) of between about 6.5 and about 10.25 inches, and more preferably, between about 6.5 and about 9.5 inches. A particularly preferred embodiment has a length of about 7.36 inches. The total travel of the shock absorber 38 preferably is between about 1 and about 5 inches, between about 1 and about 4 inches, or between about 1 and about 3.5 inches. A particularly preferred embodiment of the shock absorber 38 has a total travel of about 47 mm (or about 1.85 inches). A particularly preferred embodiment of the shock absorber 38 has a leverage ratio when installed on a bicycle of about 4:1 and, more specifically, about 3.98:1. The leverage ratio is the ratio of the travel of the wheel axis compared to the travel of the shock absorber. Thus, the wheel tends to travel about 4 times as far as the shock travel on average throughout the complete travel range of the wheel. However, the leverage ratio may vary at any particular portion of the full range of travel.

The operation of the rear shock 38 is discussed with reference to FIGS. 1-14. As discussed above, the rear shock 38 preferably is operably mounted between movable portions of the bicycle frame 22, such as between the main frame 24 (e.g., the seat tube 27) and the subframe portion 26 of the bicycle 20. Preferably, the damper tube 48 portion of the rear shock 38 is connected to the subframe portion 26 and the air sleeve 50 (and, thus, the piston rod 78 and piston 54) is connected to the seat tube 27. As shown in FIG. 1, the reservoir body portion 44 is preferably connected to the subframe portion 26 of the bicycle 20 near the rear axle. The rear shock 38 is capable of both compression and rebound motion.

When the rear wheel 30 of the bicycle 20 is impacted by a bump, the subframe portion 26 rotates with respect to the main frame portion 24, tending to compress the rear shock 38. The inertia mass 162 is biased by the force of the spring 166 to remain in the closed position. In order for the inertia mass 162 to overcome the force of the spring 166 and move to an open position such that fluid flows from the passage 168 through the reservoir shaft fluid ports 170 and into the reservoir chamber 146, the acceleration experienced by the reservoir body portion 44 along its longitudinal axis must exceed a threshold value.

For compression motion of the rear shock 38 (i.e., for the piston 54 to move into the damper tube 48), the fluid that is displaced by the piston rod 78 must flow into the reservoir chamber 146. However, when the inertia mass 162 is in a closed position with respect to the reservoir shaft fluid ports 170, fluid flow into the reservoir chamber 146 preferably is substantially impeded. When the inertia valve 160 is in the closed position, the rear shock 38 preferably remains substantially rigid. As noted above, some amount of fluid flow from the compression chamber 104 to the reservoir chamber 146 preferably is permitted through the bleed valve 174. However, preferably, the fluid flow through the bleed valve 174 is restricted to a level such that the bleed valve 174 is primarily effective for permitting settling or sag of the shock 38 over a (relatively short) period of time. The flow through the bleed valve 174 preferably is insufficient to permit the shock 38 to be responsive to bumps in response to fluid flow solely through the bleed valve 174.

However, even if the inertia valve 160 remains in the closed position, fluid can still transfer from the compression chamber 104 into the reservoir chamber 146 if the compressive force exerted on the rear shock 38 is of a magnitude sufficient to increase the fluid pressure within the primary valve chamber 182 to a pressure threshold level that will cause the compression flow shim stack 188 to open and allow fluid to flow from the primary valve chamber 182 through the compression flow passages 190 and into the reservoir chamber 146.

In the configurations described herein, the positive or extension spring force of the rear shock 38 is produced by the pressure of the gas in the primary air chamber 86. The damping rate in compression is determined mainly by the flow through the compression flow passages 190 in the reservoir body portion 44, as well as the less significant damping effects produced by the compression shim stack 114 in the main body portion 40.

If a sufficient magnitude of acceleration is imposed along the longitudinal axis of the reservoir body portion 44 (i.e., the axis of travel of the inertia mass 162), the inertia mass 162 will overcome the biasing force of the spring 166 and move downward relative to the reservoir shaft 164 into an open position. With the inertia valve 160 in the open position, hydraulic fluid is able to be displaced from the compression chamber 104 through the reservoir shaft fluid ports 170 and into the reservoir chamber 146. Thus, the rear shock 38 is able to be compressed and the compression damping preferably is determined primarily by flow through the compression flow passages 190 in the reservoir body portion 44, as well as the reservoir shaft fluid ports 170.

The mass of the inertia mass 162, the spring rate of the spring 166, and the preload on the spring 166 determine the minimum threshold for the inertia mass 162 to overcome the biasing force of the spring 166 and move to the open position. The spring rate of the spring 166 and the preload on the spring 166 are preferably selected such that the inertia mass 162 is biased by the spring 166 into a closed position when no upward acceleration is imparted in the axial direction of the reservoir body portion 44. However, the inertia mass 162 will preferably overcome the biasing force of the spring 166 when subject to an acceleration that is between 0.1 and 3 times the force of gravity (G's). Preferably, the inertia mass 162 will overcome the biasing force of the spring 166 upon experiencing an acceleration that is between 0.25 and 1.5 G's. However, the predetermined threshold may be varied from the values recited above.

With reference to FIGS. 13 and 14, when the inertia mass 162 is in the open position, the spring 166 exerts a biasing force on the inertia mass 162 which tends to move the inertia mass 162 toward the closed position. Advantageously, with the exception of the spring biasing force and fluid resistance, the inertia mass 162 moves freely within the body of fluid contained in the reservoir chamber 146 to increase the responsiveness of the inertia valve 160 and, hence, the rear shock 38 to forces exerted on the rear wheel 30. The inertia valve 160 differentiates between bumpy surface conditions and smooth surface conditions, and alters the damping rate accordingly. During smooth surface conditions, the inertia valve 160 remains in a closed position and the damping rate is desirably firm, thereby inhibiting suspension motion due to the movement of the rider of the bicycle 20. When the first significant bump is encountered, the inertia valve 160 opens to advantageously lower the damping rate so that the bump may be absorbed by the rear shock 38.

Once the rear shock 38 has been compressed, either by fluid flow through the primary valve assembly 172 or the inertia valve 160, or both, the spring force generated by the combination of the primary air chamber 86 and the second air chamber 102 tends to bias the damper tube 48 away from the air sleeve 50. In order for the rear shock 38 to rebound, a volume of fluid equal to the volume of the piston rod 78 exiting the reservoir tube 142 must be drawn from the reservoir chamber 146 and into the compression chamber 104. Fluid flow is allowed in this direction through the refill ports 192 in the primary valve assembly 172 against a desirably light resistance offered by the rebound flow shim stack 204. Gas pressure within the gas chamber 148 exerting a force on the floating reservoir piston 144 may assist in this refill flow. Thus, the rebound damping rate is determined primarily by fluid flow through the rebound flow passages 122 of the primary piston 54 against the biasing force of the rebound shim stack 124.

As discussed, the present rear shock 38 includes an inertia valve 160 comprising an inertia mass 162 and a reservoir shaft 164 having a circumferential groove 218 in the reservoir shaft 164 aligned with the reservoir shaft fluid ports 170 to create an even distribution of fluid pressure on the inertia mass 162 and, hence, substantially inhibit or prevent the inertia mass 162 from binding on the reservoir shaft 164. The off-center condition of the inertia mass 162 may cause it to contact the reservoir shaft 164 causing friction, which tends to impede motion of the inertia mass 162 on the reservoir shaft 164. Due to the relatively small mass of the inertia mass 162 and the desirability of having the inertia mass 162 respond to small accelerations, any friction between the inertia mass 162 and the reservoir shaft 164 seriously impairs the performance of the inertia valve 160 and may render it entirely inoperable. The off-center condition may result from typical variations associated with the manufacturing processes needed to produce the components of the inertia valve 160. Further, the binding effect of the inertia mass 162 may result from burrs located on the inner surface of the inertia mass 162 or the outer surface of the reservoir shaft 164. Because the inertia mass 162 advantageously has a generally smooth inner surface, the deburring operations on the inside surface of the inertia mass 162 are substantially simplified and the risk of binding is substantially reduced.

Improved Inertia Valve Design

In any of the embodiments disclosed herein, the inertia mass 162 of the inertia valve 160 can comprise one or more dense materials that include a relatively small size-to-weight ratio. For example, in certain arrangements, the inertia mass 162 comprises brass, other alloys or metals and/or the like. As discussed in greater detail herein, the use of such dense materials can decrease the size of the inertia mass 162, so as to advantageously decrease the overall size of the inertia valve 160 and the reservoir body portion 44. In some embodiments, the inertia mass 162 comprises one or more materials having a density of approximately 6 to 9 g/cc (e.g., 6.0 g/cc, 6.5 g/cc, 7.0 g/cc, 7.5 g/cc, 7.5 g/cc, 8.0 g/cc, 8.5 g/cc, 9 g/cc, densities between these values, etc.). In other arrangements, the density of a material that comprises the inertia mass 162 is lower than 6 g/cc or greater than 9 g/cc, as desired or required.

However, some dense materials, such as brass, other alloys or metals, other non-metallic materials and/or the like, can have poor wear-resistance characteristics. Consequently, because in some embodiments the inertia mass 162 is configured to be slidably supported by a reservoir shaft 164 or other member, the use of brass and/or other dense materials may, over time, result in undesirable wear along the surfaces of the mass 162. Accordingly, in order to reduce or eliminate material erosion or wear of such dense alloys and/or other materials, one or more protective layers, coatings and/or the like can be positioned on the surfaces of the inertia mass 162 (and/or other components of a damping system) that generally contact an adjacent member of the reservoir body portion 44 (e.g., the reservoir shaft 164). This can help protect the dense materials (e.g., brass) that would otherwise be susceptible to damage resulting from repeated contact with one or more adjacent surfaces. As a result, such enhanced embodiments of the inertia mass 162 can help extend the life of the valve 160 and/or other components of the reservoir body portion 44, while taking advantage of the relatively small size of the mass 162 resulting from the use of dense materials.

In addition, such designs can help reduce the amount of debris of brass and/or other materials that would otherwise wear off the inertia mass 162 and enter the reservoir chamber 146 and/or other interior areas of the reservoir body portion 44. This generally helps improve the performance of the inertia valve 160 and the entire damper system. For example, the protected inertia mass 162 can provide a cleaner environment within the reservoir chamber 146, as the presence of wear debris is reduced or eliminated. Accordingly, the likelihood of contamination of the oil or other hydraulic fluid within the interior of the reservoir chamber 146 and other portions of the damping system is decreased. This can advantageously allow the inertia mass 162 to freely move as originally intended while the bicycle is being used, without altering the hydraulic characteristics of the fluid within the reservoir chamber 146. Relatedly, by maintaining the integrity and the desired surface characteristics (e.g., smoothness) of the inertia mass 162, the function of the inertia valve 160 will not diminish over time due to undesirable wearing. As a result, such configurations can help extend the life of the inertia mass 160 and prolong the time between required service or maintenance activities.

Moreover, brass and some other dense materials typically offer less desirable anti-friction characteristics. Such physical properties can interfere with the ability of the inertia mass 162 to slide relative to the reservoir shaft 164. As a result, the inertia mass 162 may not be able to achieve or maintain the desired or required bump sensitivity in accordance with the intended design of the damping system, resulting in diminished performance. Thus, the protective coatings, layers and/or the like positioned or located along the exterior surfaces of the inertia mass 162 can be selected to also provide improved anti-friction properties (e.g., a lower coefficient of friction) to the inertia valve 160.

Figure 16:
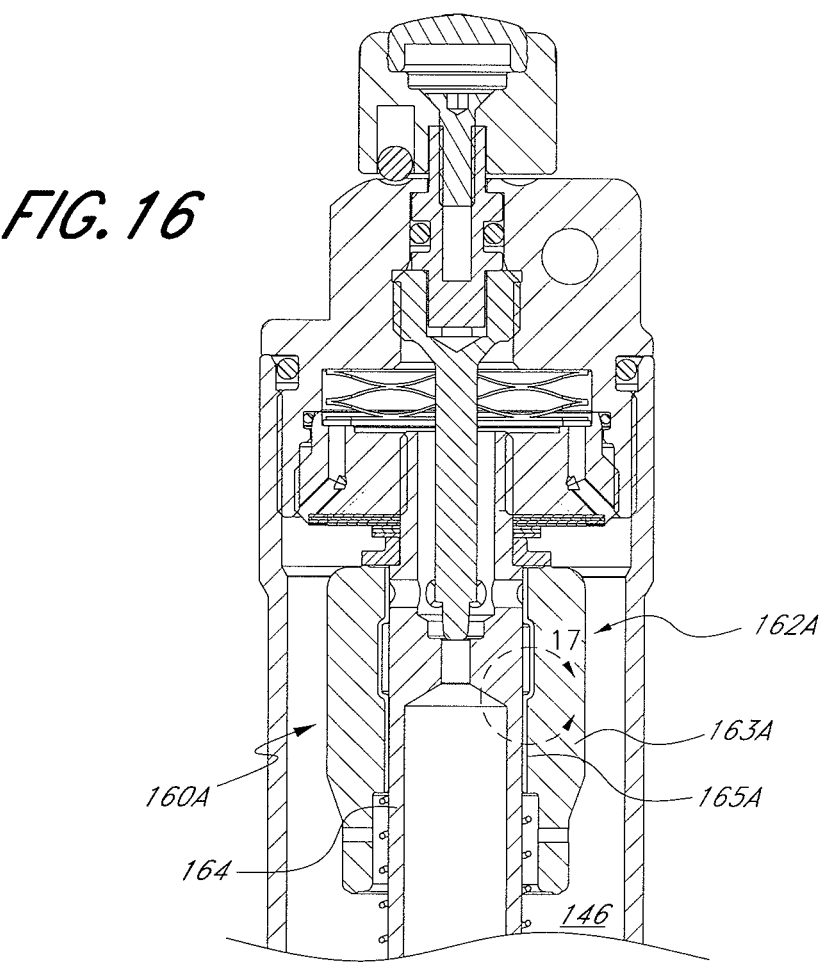
FIG. 16 is a cross-section of a reservoir showing an inertia mass having a protective coating or layer according to one embodiment.
Figure 17:
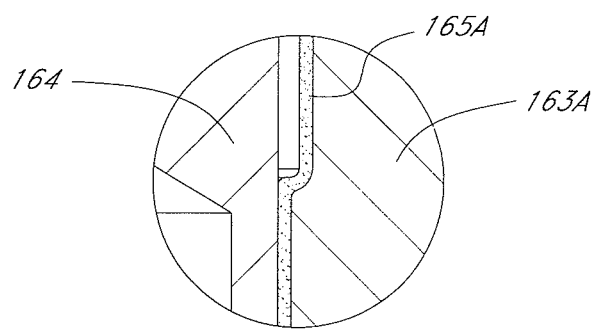
FIG. 17 is a detailed cross-sectional view of the inertia mass of FIG. 16.

According to certain embodiments, such as the one illustrated in FIGS. 16 and 17, at least a portion of the interior surface (e.g., generally along the inner bore) of the inertia mass 162A includes one or more coatings 165A, layers and/or the like. As shown, such coatings or layers 165A can be configured to contact the adjacent outer surface of the reservoir shaft 164 when the inertia mass 162A moves within the reservoir chamber 146 (e.g., when the rear wheel of the bicycle is impacted by a bump or other surface feature).

As discussed in greater detail herein, a main portion 163A of the inertia mass 162A can comprise brass, another dense alloy or metal and/or any other material. The use of a dense material can advantageously reduce the size of the mass 162A and the valve 160A, and thus, the size and weight of the damping system.

In some arrangements, at least some portions of the interior surface of the inertia mass 162A comprise an electroless nickel (EN) coating or plating 165A. Thus, the inertia mass 162A of the inertia valve 160A can include a main portion 163A (e.g., brass, another dense alloy or metal, etc.) that has been generally protected with one or more coatings 165A, layers, platings and/or the like. As noted above, the EN coating 165A can improve the anti-friction and/or wear resistance properties of the inertia mass 162A, thereby enhancing the performance of the inertia valve 160 and the overall dampening system. Further, EN and/or other protective coatings 162A can provide additional benefits to the inertia mass 162A, such as, for example, corrosion resistance, durability, strength and/or the like.

According to some embodiments, EN and/or other coating 165A is deposited on the main portion 163A (e.g., brass) using an auto-catalytic reaction. Such an auto-catalytic reaction can permit the EN coating 165A to be provided on a desired surface of the main body portion 163A generally evenly, regardless of the shape, geometry and/or other characteristics of the surface being plated. This is illustrated in embodiment depicted in FIGS. 16 and 17. While this method is believed to be preferred, any other method or device can be used to provide a protective coating or layer along the main portion 163A of the inertia valve 162A, either in addition to or in lieu of auto-catalytic reactions, and achieve one or more advantages of the disclosed embodiment. For instance, a surface coating or layer 165A can be deposited or otherwise positioned along the main portion 163 using electroplating, other plating methods and/or the like. In other embodiments, a protective coating or layer 165A comprises chrome (e.g., hard chrome), ceramic and/or any other material, either in addition to or in lieu of nickel.

In many of the configurations disclosed herein, the coating or other layer situated along the interior bore or other surface of an inertia mass comprises a density that is generally lower than the density of the underlying materials. For example, the density of the EN coating can be approximately 7.5 to 8.5 g/cc. However, the density of the EN coating or any other layer can be less than 7.5 g/cc or greater than 8.5 g/cc. In some embodiments, the ratio of the density of the coating along the interior bore of the inertia mass and the density of the underlying portions of the inertia mass can be between 0.5 to 1.5 (e.g., 0.5, 0.6, 0.7, 0.8, 0.9, 1.0, 1.1, 1.2, 1.3, 1.4, 1.5, ratios between such values, etc.). Alternatively, such a ratio can be less than 0.5 or greater than 1.5, as desired or required.

Further, in certain arrangements, the hardness of the EN or other coating is approximately 40 to 60 HRC. In addition, the hardness of the dense materials (e.g., brass) that comprise the main portion of an inertia valve can be approximately 25 to 85 HRB.

Figure 18:
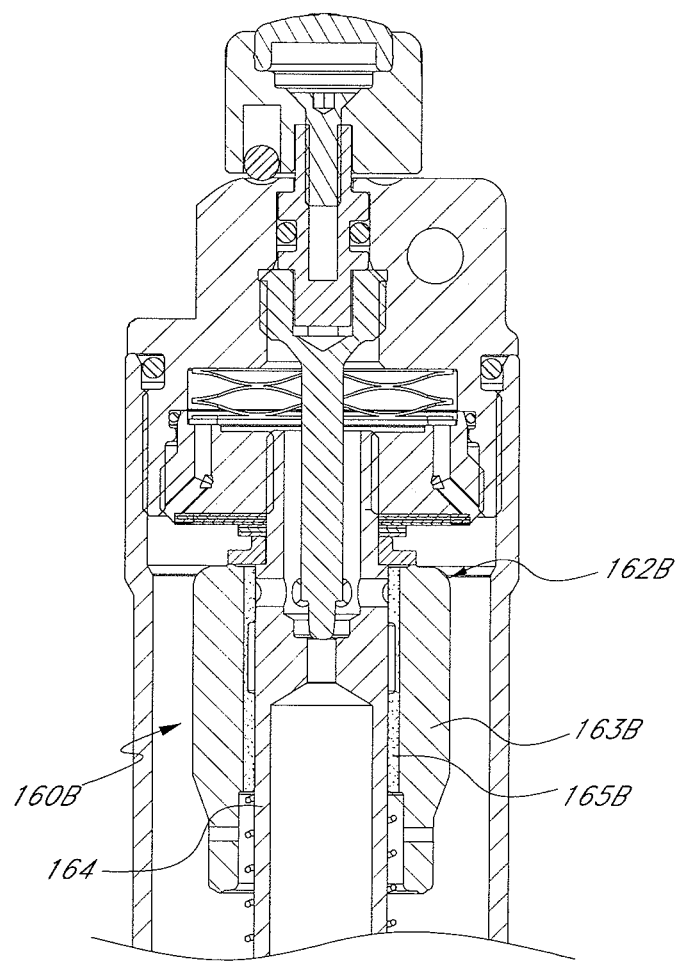
FIG. 18 is a cross-section of a reservoir showing an inertia mass having a protective coating or layer according to another embodiment.

FIG. 18 illustrates a different embodiment of an inertia mass 162B comprising a protective coating or layer 165B along at least a portion of its interior exposed surface. The surface coating or layer 165B in the depicted arrangement is generally thicker than the coating 165A of the inertial mass 162A of FIGS. 16 and 17. Further, as shown, the shape, thickness and/or characteristics of the protective coating or layer 165B can vary along the surface of the inertia mass 162B, as desired or required. For example, in FIG. 18, the protective coating, plating or layer 165B is generally thinner along the annular groove 212B of the inertia mass 162B. As a result, in the illustrated arrangement, although the thickness of the coating 165B varies, the distance to which such a coating 165A extends relative to the reservoir shaft 164 remains generally constant. In other embodiments, the thickness and/or the depth of the coating 165B can be different than illustrated herein, as desired or required.

As discussed herein, in some embodiments, a protective coating or layer is placed along at least a portion of an interior bore or other outer surface of the inertia mass. However, in embodiments where a brass mass is sliding within a corresponding bore, such a protective coating or layer can be placed along at least a portion of an outer diameter of a brass mass.

Figure 19:
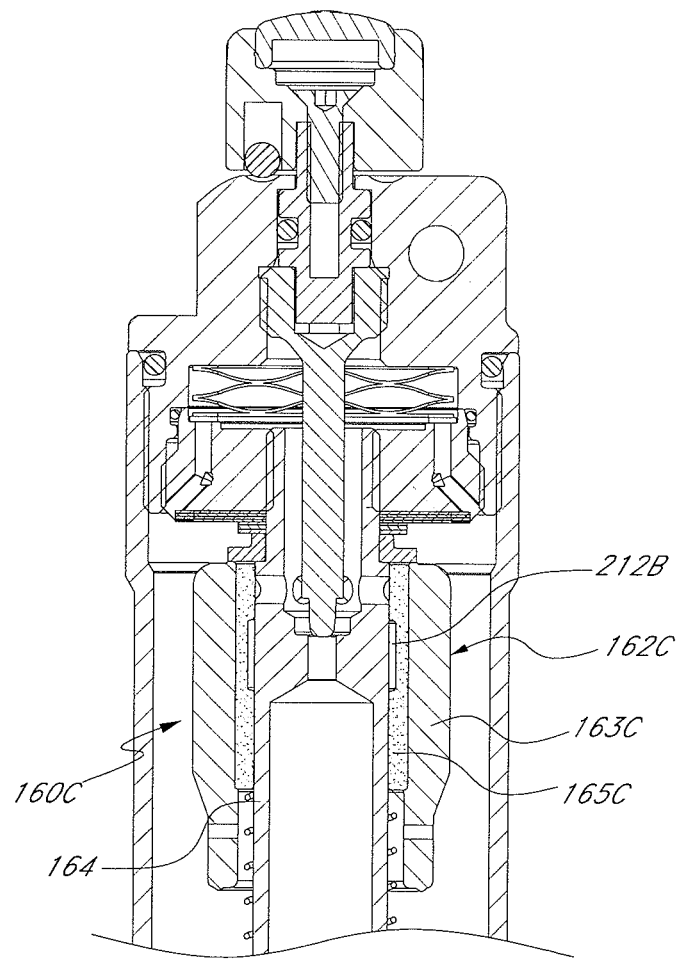
FIG. 19 is a cross-section of a reservoir showing an inertia mass having a main portion and a protective carrier material joined thereto according to one embodiment.

Another embodiment of an inertia mass 162C that is adapted to have enhanced wear resistance and anti-friction properties is illustrated in FIG. 19. As shown, the inertia mass 162C can comprise two or more separate portions 163C, 165C that are joined together to form a unitary structure. For instance, the inertia mass 162 can include a carrier portion 165C that is sized, shaped and otherwise configured to mate with the adjacent exterior surface of the reservoir shaft 164. In some arrangements, the carrier portion 165C comprises hardened steel and/or any other material capable of providing the desired wear-resistance, anti-friction, durability and/or other physical characteristics. The carrier portion 165C can be joined to the adjacent dense material portion 163C (e.g., comprising brass, another alloy or metal, etc.) using one or more attachment methods or devices, such as, for example, adhesives or other bonding agents, an interference press-fit connection, a threaded joint, other mechanical fasteners and/or the like. In some embodiments, the size of the carrier portion 165C is kept relatively small in order to increase the overall density of the inertia mass 162C. However, the sizes, shapes, locations, relative proportions and/or other properties of the carrier portion 165 and the dense material portion 163C can be different than illustrated in FIG. 19, as desired or required.

Figure 20:
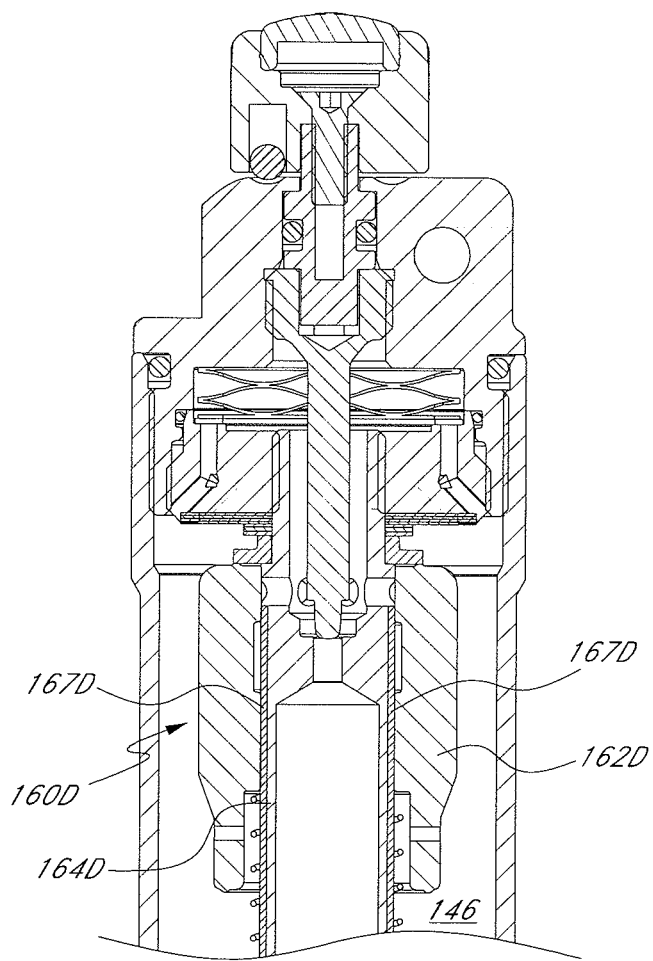
FIG. 20 is a cross-section of a reservoir showing a reservoir shaft of an inertia valve having a protective coating or layer along its exterior surface according to one embodiment.

In other embodiments, as illustrated in FIG. 20, a protective coating or layer 167D can be placed along at least a portion of the outer surface of the reservoir shaft 164D, either in lieu of or in addition to any protective layers or coatings along the interior exposed surface of the adjacent inertia mass 162D. Accordingly, the wear resistance and anti-friction properties of the system can be further enhanced.

Figure 21:
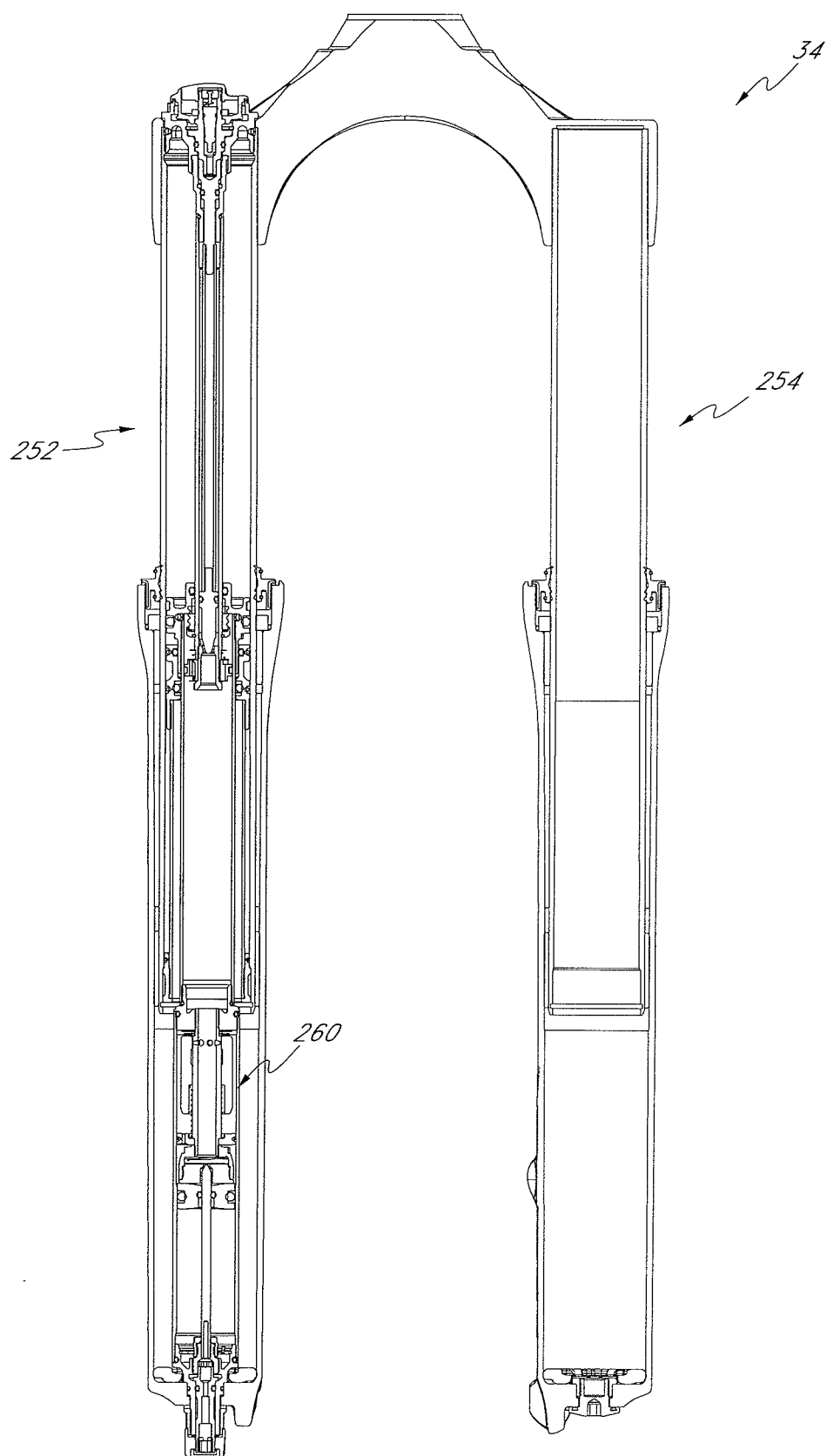
FIG. 21 is a cross-sectional view of the fork legs of the front suspension assembly of a bicycle's front suspension assembly according to one embodiment.

The various coatings, layers and/or any other features disclosed herein can be used on surfaces of an inertia valve assembly that is positioned at other locations of a bicycle. For example, as illustrated in FIG. 21, such protective coatings or layers can be applied to the inertia mass, reservoir shaft and/or other components of an inertial valve assembly 260 situated within a first fork leg 252 and/or a second fork leg 254 of a bicycle's front suspension fork 34. Additional details regarding the use of inertia valve assemblies within or near a front suspension fork 34 are disclosed in U.S. Publication No. 2009/0001684 (U.S. patent application Ser. No. 12/134,116, filed Jun. 5, 2008 and titled BICYCLE SUSPENSION ASSEMBLY), the entirety of which is hereby incorporated by reference herein and made a part of the present specification.

Further, the use of protective coatings or layers, protective carrier materials and/or the like can be used in any other component or portion of a damping system that is susceptible to wear, friction, durability and/or other problems associated with the relative movement of adjacent surfaces. For example, mating components and/or surfaces of the damper tube 48 and the air sleeve 50 of the rear shock 38 can include such protective coatings, layers and/or the like. As discussed above with reference to the inertia mass, such arrangements can reduce wear and friction, and improve the durability and overall performance of a dampening system.

Figure 15:
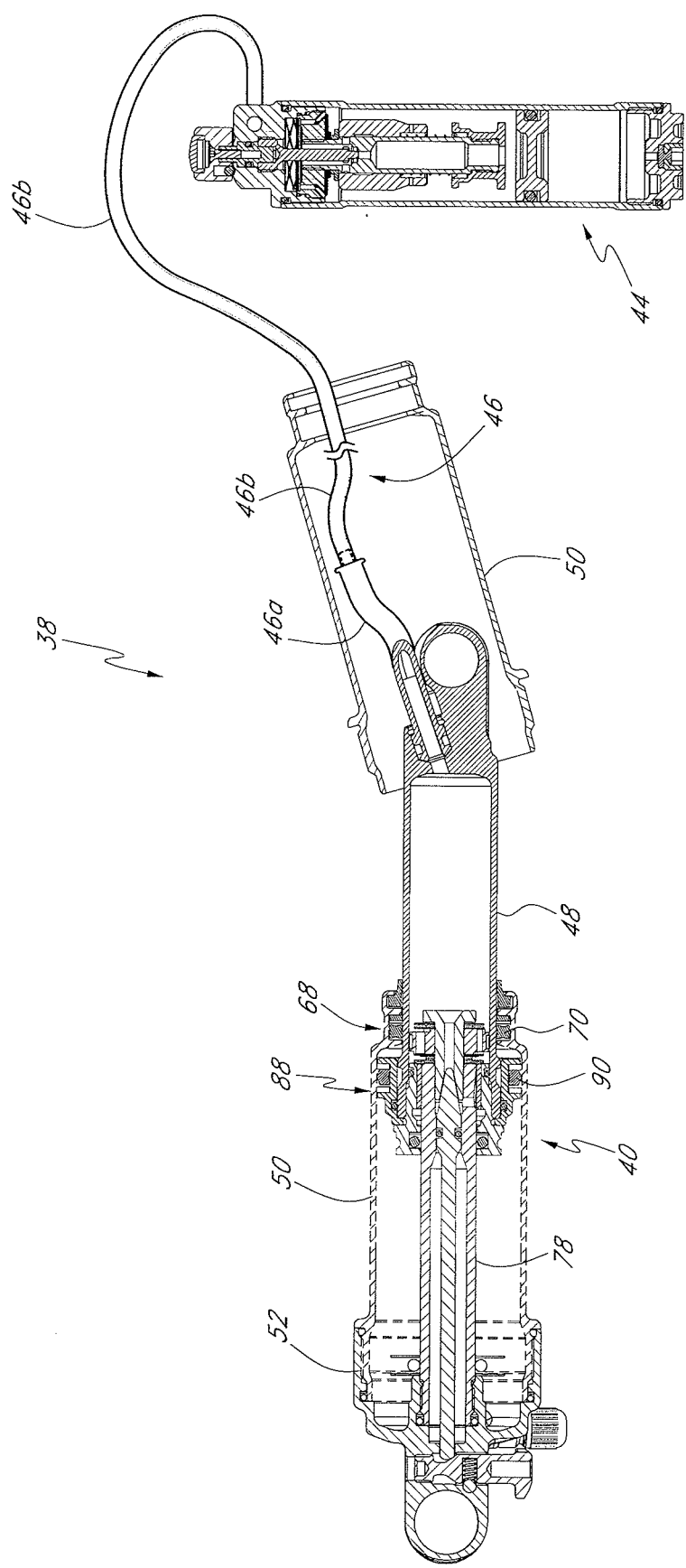
FIG. 15 is an elevation view of the shock absorber of FIG. 2 with the air sleeve in a partially disassembled state and moved along the damper tube toward the reservoir, which permits seal components of the air spring to be replaced without disassembly of the damper.

With reference to FIGS. 2 and 15, preferably, the shock absorber 38 is configured to permit at least partial disassembly of the suspension spring portion without disassembly of the damper portion. Thus, routine servicing of the suspension spring is made possible, without necessitating draining of the damping fluid from the damper. Accordingly, the routine servicing of the suspension spring is much more convenient. The servicing of the suspension spring usually involves replacement and/or lubrication of one or more seals (e.g., seal 90, seal 70) of the suspension spring. However, access to the interior of the air sleeve 50 for any purpose is enhanced.

In the illustrated arrangement, the air sleeve 50 can be uncoupled from the end cap 52 and slid towards the closed end 60 of the damper tube 48. The tube assembly 46 is configured such that the air sleeve 50 can pass over the tube portion 46a of the tube assembly 46 a sufficient distance to permit servicing of the air spring. As illustrated, preferably, the tube portion 46a exits the damper tube 48 at less than a 90 degree angle relative to a longitudinal axis of the damper tube 48. More preferably, the tube portion 46a exits the damper tube 48 at less than 75 degrees, less than 60 degrees or less than 45 degrees relative to the longitudinal axis of the damper tube 48. In one preferred arrangement, the angle is approximately 45 degrees relative to the longitudinal axis of the damper tube 48. In addition, the tube portion 46a preferably has a maximum width (dimension in a direction generally perpendicular to a line connecting the centers of the openings at the end portions) that is less than the diameter of the interior space of the air sleeve 50. Thus, the air sleeve 50 preferably can pass partially or completely over the tube portion 46a. One or more of the exit angle, shape or size of the tube portion 46a assists in permitting the air sleeve 50 to pass partially or completely over the tube portion 46a of the tube assembly 46.

Preferably, the air sleeve 50 can pass over the tube portion 46a a sufficient distance such that the seal 90 of the air spring piston 56 is exposed or accessible. In at least one arrangement, the air sleeve 50 can pass over the tube portion 46a a sufficient distance such that the seal 70 passes beyond the closed end 60 of the damper tube 48. In at least one arrangement, the air sleeve 50 can pass completely over the tube portion 46a. If necessary or desired, new seals (e.g., seals 70 and/or 90) can be passed over reservoir body portion 44 or over the end cap 52 and assembled to the air sleeve 50 or piston 56, respectively. In some arrangements, the end cap 52 may be removable from the piston rod 78, without releasing damping fluid from the damper, and the replacement seals can be passed over the piston rod 78 and assembled to the air sleeve 50 or piston 56.

As the accompanying figures show, the rear shock 38 has other features and components such as seals which will are shown but not described herein that are obvious to one of ordinary skill in the art. Accordingly, a discussion of these features has been omitted.

Although the present invention has been explained in the context of several preferred embodiments, minor modifications and rearrangements of the illustrated embodiments may be made without departing from the scope of the invention. For example, but without limitation, although the preferred embodiments described the bicycle damper for altering the rate of compression damping, the principles taught may also be utilized in damper embodiments for altering rebound damping, or for responding to lateral acceleration forces, rather than vertical acceleration forces. In addition, although the preferred embodiments were described in the context of an off-road bicycle application, the present damper may be modified for use in a variety of vehicles, or in non-vehicular applications where dampers may be utilized. Furthermore, the pressure and flow equalization features of the inertia valve components may be applied to other types of valves, which may be actuated by acceleration forces or by means other than acceleration forces. Accordingly, the scope of the present invention is to be defined only by the appended claims.

What is claimed is:

1. A bicycle damping assembly comprising:
   a damper tube having a first end portion, a second end portion and a side wall extending between said first end portion and said second end portion;
   a piston rod that carries a first piston, said first piston and said piston rod capable of telescopic movement with respect to said damper tube;
   a seal head that creates a seal between said first end portion of said damper tube and said piston rod;
   a reservoir chamber defined by said bicycle damping assembly;
   a fluid passage that extends between a compression chamber and said reservoir chamber; and
   a compression damping circuit that regulates compression fluid flow between said compression chamber and said reservoir chamber, said compression damping circuit comprising a pressure-activated valve including a partition and an acceleration-activated valve including an inertia mass;
wherein said inertia mass is configured to slidably move relative to a reservoir shaft;
wherein the inertia mass comprises an internal surface positioned adjacent to the reservoir shaft, said interior surface of the inertia mass being configured to contact an outer surface of the reservoir shaft;
wherein said inertia mass comprises a main portion and at least one protective coating or layer, wherein said main portion of said inertia mass comprises brass, said at least one protective coating or layer being positioned directly along the interior surface of the inertia mass, wherein at least a portion of said at least one protective coating or layer is configured to contact said reservoir shaft;
wherein a density of the protective coating or layer is greater than a density of the main portion, and wherein and a coefficient of friction of the protective coating or layer is greater than and a coefficient of friction of the main portion; and
wherein said at least one protective coating or layer helps shield said main portion from contact with said reservoir shaft.

2. The assembly of claim 1, wherein said main portion of said inertia mass comprises at least one material having an alloy or metal with a density of approximately 6 to 9 g/cc.

3. The assembly of claim 1, wherein said at least one protective coating or layer comprises nickel.

4. The assembly of claim 1, wherein said at least one protective coating or layer is applied to said main portion using a plating method.

5. The assembly of claim 4, wherein said plating method comprises electroless plating.

6. The assembly of claim 4, wherein said plating method comprises electroplating.

7. The assembly of claim 1, wherein said at least one protective coating or layer comprises an electroless nickel plating.

8. The assembly of claim 1, wherein said main portion and said at least one protective coating or layer are joined using an adhesive, a bonding agent, an interference press-fit connection, a threaded joint or other mechanical fastener.

9. The assembly of claim 1, further comprising an annular groove, said annular groove located at least partially along the interior surface of the inertia mass, wherein the inertia mass does not contact the reservoir shaft along the annular groove;
wherein the at least one protective coating or layer is generally thinner along the annular groove than in adjacent portions of the of the inertia mass; and
wherein a thickness of the at least one coating or layer varies along a longitudinal axis of the inertia mass, and wherein a distance from the exterior surface of the reservoir shaft to a radial location to which the carrier material extends remains generally constant along the length of the carrier material.

10. A bicycle damping assembly comprising:
a damper tube;
a piston rod that carries a first piston, said first piston and said piston rod capable of telescopic movement with respect to said damper tube, wherein said first piston cooperates with said damper tube to at least partially define a variable volume compression chamber;
a reservoir tube having a first end portion, a second end portion and a side wall extending between said first end portion and said second end portion, a portion of an interior space of said reservoir tube defining a reservoir chamber;
a fluid passage that extends between said compression chamber of said damper tube and said reservoir tube, wherein said fluid passage communicates with an opening in said reservoir tube;
a compression damping circuit within said reservoir tube that regulates compression fluid flow between said compression chamber and said reservoir chamber, said compression damping circuit comprising a pressure-activated valve including a partition and an acceleration-activated valve including an inertia mass;
wherein said inertia mass is configured to slidably move within said reservoir tube relative to a reservoir shaft;
wherein said inertia mass comprises a main portion and a carrier material positioned along an interior surface of said inertia mass and directly on the main portion, wherein said main portion of said inertia mass comprises brass, said carrier material configured to contact an exterior surface of said reservoir shaft when said inertia mass moves within said reservoir tube;
wherein a density of the carrier material is greater than a density of the main portion, and wherein and a coefficient of friction of the carrier material is greater than and a coefficient of friction of the main portion; and
wherein said main portion is secured to said carrier material such that said main portion is generally shielded from contact with said reservoir shaft.

11. The assembly of claim 10, wherein said main portion of said inertia mass comprises at least one alloy or metal.

12. The assembly of claim 10, wherein said carrier material comprises a hardened material.

13. The assembly of claim 10, wherein said carrier material comprises nickel.

14. The assembly of claim 10, wherein said main portion and said carrier material are joined using an adhesive, a bonding agent, an interference press-fit connection, a threaded joint or a mechanical fastener.

15. The assembly of claim 10, further comprising an annular groove located along the interior surface of the inertia mass, wherein the inertia mass does not contact the reservoir shaft along the annular groove;
wherein the carrier material is generally thinner along the annular groove than in adjacent portions of the of the inertia mass; and
wherein a thickness of the carrier material varies along a longitudinal axis of the inertia mass, and wherein a distance from the exterior surface of the reservoir shaft to a radial location to which the at least one coating or layer extends remains generally constant along the length of the at least one coating or layer.

* * * * *